US011115486B2

(12) United States Patent
Jimenez Salgado et al.

(10) Patent No.: US 11,115,486 B2
(45) Date of Patent: Sep. 7, 2021

(54) DATA RE-USE ACROSS DOCUMENTS

(71) Applicant: MICROSOFT TECHNOLOGY LICENSING, LLC, Redmond, WA (US)

(72) Inventors: Rolando Jimenez Salgado, Redmond, WA (US); David Mowatt, Dublin (IE); Andreas Balzer, Dublin (IE); Muiris Woulfe, Dublin (IE); Johnny S. Campbell, Woodinville, WA (US); Stephen O'Driscoll, Dublin (IE); Venkat Pradeep Chilakamarri, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 107 days.

(21) Appl. No.: 16/058,133

(22) Filed: Aug. 8, 2018

(65) Prior Publication Data

US 2020/0053176 A1  Feb. 13, 2020

(51) Int. Cl.
*H04L 29/08* (2006.01)
*G06F 16/93* (2019.01)

(52) U.S. Cl.
CPC .............. *H04L 67/22* (2013.01); *G06F 16/94* (2019.01)

(58) Field of Classification Search
CPC ......... H04L 67/72; H04L 67/22; H04L 29/06; H04L 41/0266; G06F 17/30; G06F 9/466; G06F 16/289; G06F 9/4493; G06F 17/246; G06F 16/86
USPC ....................................................... 709/204
See application file for complete search history.

(56) References Cited

U.S. PATENT DOCUMENTS

| | | | | |
|---|---|---|---|---|
| 5,581,760 A * | 12/1996 | Atkinson | ................ | G06F 9/543 717/108 |
| 5,809,607 A * | 9/1998 | Elson | .................... | A47L 13/256 15/147.2 |
| 6,112,181 A * | 8/2000 | Shear | ...................... | G06F 21/10 705/7.29 |
| 6,411,954 B1 * | 6/2002 | Roffe | ...................... | G06F 9/466 |

(Continued)

OTHER PUBLICATIONS

Atkinson et al., "An Approach to Persistent Programming", 1983 (Year: 1983).*

(Continued)

*Primary Examiner* — Ondrej C Vostal
(74) *Attorney, Agent, or Firm* — Newport IP, LLC; Han Gim

(57) ABSTRACT

Techniques for managing data include receiving, at a data store, a persistent data object generated by a source application, the object configured to be compatible with a plurality of applications and document types. The object is associated with a unique identifier. In response to a request for the object, the object is accessed based on its unique identifier and sent to a computing device executing a destination application. The object is incorporated by and is compatible with a destination document being edited by the destination application. An update to the object is received that is generated by a user application editing a user document. In response to receiving an indication that the object has been inserted in the destination document, the update is sent by the data store to the destination computing device and is usable to update the object as incorporated in the destination document.

18 Claims, 13 Drawing Sheets

(56) References Cited

U.S. PATENT DOCUMENTS

| | | | | |
|---|---|---|---|---|
| 6,601,087 | B1* | 7/2003 | Zhu | G06Q 10/10 |
| | | | | 709/204 |
| 6,654,022 | B1* | 11/2003 | Egan | G06T 1/60 |
| | | | | 345/501 |
| 7,024,656 | B1* | 4/2006 | Ahad | G06F 16/86 |
| | | | | 717/116 |
| 7,610,263 | B2 | 10/2009 | Dettinger et al. | |
| 7,702,649 | B1* | 4/2010 | Bresch | G06F 16/86 |
| | | | | 707/999.104 |
| 8,069,411 | B2 | 11/2011 | Titemore et al. | |
| 8,225,204 | B2 | 7/2012 | Cheng | |
| 8,290,958 | B2 | 10/2012 | Boone et al. | |
| 8,516,607 | B2* | 8/2013 | Mao | H04L 67/104 |
| | | | | 709/201 |
| 9,600,528 | B2 | 3/2017 | Mackinlay et al. | |
| 2001/0043345 | A1* | 11/2001 | Rumph | G06F 3/1208 |
| | | | | 358/1.9 |
| 2003/0088852 | A1* | 5/2003 | Lacas | H04L 67/36 |
| | | | | 717/121 |
| 2003/0163439 | A1* | 8/2003 | Hankin | G06F 16/289 |
| 2003/0225903 | A1* | 12/2003 | Lodha | H04L 41/0896 |
| | | | | 709/232 |
| 2004/0148567 | A1 | 7/2004 | Jeon et al. | |
| 2008/0147724 | A1* | 6/2008 | Suvernev | G06F 16/24532 |
| 2010/0180266 | A1* | 7/2010 | Hiniker | G06F 8/41 |
| | | | | 717/140 |
| 2012/0290926 | A1* | 11/2012 | Kapadia | G06F 17/24 |
| | | | | 715/255 |
| 2013/0014258 | A1* | 1/2013 | Williams | G06Q 30/0241 |
| | | | | 726/24 |
| 2014/0189889 | A1* | 7/2014 | Winters | G06F 21/6218 |
| | | | | 726/30 |
| 2015/0154234 | A1 | 6/2015 | Sreedharan | |
| 2015/0293946 | A1* | 10/2015 | Fong | G06F 16/212 |
| | | | | 707/811 |
| 2016/0063223 | A1* | 3/2016 | Raley | G06F 21/105 |
| | | | | 705/51 |
| 2016/0065571 | A1* | 3/2016 | Hoyos | H04L 63/0861 |
| | | | | 713/168 |
| 2016/0173529 | A1* | 6/2016 | Baig | H04L 63/0236 |
| | | | | 726/13 |
| 2016/0191576 | A1* | 6/2016 | Thompson | H04N 21/00 |
| | | | | 709/204 |
| 2017/0139891 | A1* | 5/2017 | Ah-Soon | G06F 17/246 |
| 2017/0289210 | A1* | 10/2017 | Pai | H04L 67/26 |
| 2018/0004430 | A1 | 1/2018 | Merritt et al. | |
| 2018/0048464 | A1* | 2/2018 | Lim | H04L 9/08 |
| 2018/0189343 | A1* | 7/2018 | Embiricos | G06F 16/2358 |

OTHER PUBLICATIONS

Merriam-Webster, "incorporate", 2021 (Year: 2021).*
Microsoft Computer Dictionary, "application programming interface", 5th edition, 2002 (Year: 2002).*
Microsoft Computer Dictionary, "object", 5th edition, 2002 (Year: 2002).*
Kolland, et al., "Information Sharing in Collaborative Environments", In Proceedings of the 3rd IEEE Workshop on Enabling Technologies: Infrastructure for Collaborative Enterprises, Apr. 17, 1994, pp. 140-154.
"International Search Report and Written Opinion Issued in PCT Application No. PCT/US2019/038825", dated Sep. 18, 2019, 19 Pages.
Beals, M. H., "Transforming Data for Reuse and Re-publication with XML and XSL", Retrieved From https://programminghistorian.org/lessons/transforming-xml-with-xsl, Jul. 7, 2016, 18 Pages.

* cited by examiner

| ID | Title (text) | Author (person) | Modified (timedate) |
|---|---|---|---|
| 1273893 | Happy with sales process? | Bob Smith | 15/9/2018 18:31 |
| 1273894 | Likely to buy more? | Bob Smith | 15/9/2018 18:32 |

FIGURE 2

| ID | Ver | Title (text) | Author (person) | Modified (timedate) | Access Rights | Type |
|---|---|---|---|---|---|---|
| 1273893 | 1.0 | Happy with sales process? | Bob Smith | 15/9/2018 18:31 | Bob, Fred | Simplex |
| | 1.1 | Sales process satisfaction | Fred Jacoby | 18/9/2018 10:12 | Bob, Fred | Simplex |
| 1273894 | 1.0 | Likely to buy more? | Bob Smith | 15/9/2018 18:32 | Bob, Fred | Simplex |
| | 1.1 | Likelihood of additional purchase | Fred Jacoby | 18/9/2018 10:12 | Bob, Fred | Simplex |

FIGURE 3

| ID | Ver | Title (text) | Author (person) | Modified (timedate) | Access Rights | Type | Parent Location (URL) | Item |
|---|---|---|---|---|---|---|---|---|
| 1273893 | 1.0 | Happy with sales process? | Bob Smith | 15/9/2018 18:31 | Bob, Fred | Simplex | Notes.contoso365.com/customerfeedback | 1 |
| | 1.1 | Sales process satisfaction | Fred Jacoby | 18/9/2018 10:12 | Bob, Fred | Simplex | Notes.contoso365.com/customerfeedback | 1 |
| 1273894 | 1.0 | Likely to buy more? | Bob Smith | 15/9/2018 18:32 | Bob, Fred | Simplex | Notes.contoso365.com/customerfeedback | 2 |
| | 1.1 | Additional Purchase Likelihood | Fred Jacoby | 18/9/2018 10:12 | Bob, Fred | Simplex | Notes.contoso365.com/customerfeedback | 2 |
| | 1.2 | Additional Purchase Likelihood | Fred Jacoby | 18/9/2018 10:12 | Bob, Fred | Simplex | Notes.contoso365.com/customerfeedback | 3 |
| 1290761 | 1.0 | Review budget | Bob Smith | 22/10/2018 11:17 | Bob | Simplex | Notes.contoso365.com/Octoberagenda | 1 |
| 1291281 | 1.0 | Frequency of historic purchase | Bob Smith | 22/10/2018 15:13 | Bob, Fred | Simplex | Notes.contoso365.com/customerfeedback/2 | 2 |

FIGURE 4

| ID | Ver | Title (text) | Type | Item | Happy Count | Neutral Count | Unhappy Count | Average |
|---|---|---|---|---|---|---|---|---|
| 1273893 | 1.0 | Happy with sales process? | Simplex | 1 | | | | |
| | 1.0 | Sales process satisfaction | Simplex | 1 | | | | |
| | 1.1 | Sales process satisfaction | Simplex | 1 | | | | |
| | 1.2 | How satisfied are you with our sales process? | Survey | 1 | 0 | 0 | 0 | null |
| 1273894 | 1.0 | Likely to buy more? | Simplex | 2 | | | | |
| | 1.1 | Additional Purchase Likelihood | Simplex | 2 | | | | |
| | 1.2 | Additional Purchase Likelihood | Simplex | 3 | | | | |
| | 1.2 | How likely are you to purchase from us again? | Survey | 3 | 0 | 0 | 0 | Null |
| 1290761 | 1.0 | Review budget | Simplex | 1 | | | | |
| 1291281 | 1.0 | Frequency of historic purchase | Simplex | 2 | | | | |
| | 1.1 | How often have you purchased from us previously? | Survey | 2 | 0 | 0 | 0 | Null |

FIGURE 5

DATA RE-USE ACROSS DOCUMENTS

BACKGROUND

Today's workforce accomplishes many tasks using a variety of devices, software applications, and web-based services. A user may, for example, use a phone to capture data and take notes, and share information with colleagues using one or more applications and services. The user may use the phone or another computing device to work on the information and develop other work products during the course of a project, using the same or different applications and services.

A number of documents may be generated and developed during the course of a project. Various versions of these documents may be generated. Finding documentation, past or present, about a topic can be time consuming and difficult if not impossible. Furthermore, some parts of documents may be copied or cut and pasted into other documents of the same or different applications. If the original source that was copied was incorrect or is later updated, then all downstream users who copied the original source will have incorrect or obsolete information.

Some systems provide the ability to insert or embed information into documents. However, such systems do not support sharing of the information or provide any way of updating the embedded information in a dynamic manner with control of the changes and in a way that the information can be readily shared. Furthermore, users typically use a variety of applications and devices, and some pieces of information must be modified or translated to be able to rendered or otherwise consumed by different applications and devices.

These shortcomings can be inconvenient for users and cause significant inefficiencies with respect to the utilization of computing resources. For example, opening and interacting with multiple applications to view and share relevant information regarding a particular context or topic can result in the inefficient utilization of processor cycles, memory, battery power, and network bandwidth. Similarly, the dissemination of information that can become obsolete can lead to significant rework and delays due to manual updating, not to mention the cost of not catching an erroneous piece of information in a document. Furthermore, the inability to dynamically update pieces of information across devices and applications without manual intervention can cause inefficient computer interactions that increase the frequency of inadvertent or erroneous user inputs which, in turn, cause further inefficiencies with respect to the utilization of computing resources and lost time and effort to achieve compatibility between users. Given these drawbacks and others, there still exists a need for tools that can efficiently share, re-use, and update information in a dynamic manner.

It is with respect to these and other technical challenges that the disclosure made herein is presented.

SUMMARY

The present disclosure describes various embodiments that enable the use of a segment or chunk of information which can be shared and reused among users and documents, and yet can evolve in form and content (e.g., via its metadata) as the information is developed and refined. As used herein, a chunk of information may generally be defined as a set of modifiable and reusable data that has associated metadata and may be uniquely identified. A chunk of information may be referred to herein as a modular unit of information or alternatively as a modern unit of information (MUI). A chunk of information may also be referred to herein as a persistent data object. These terms may be used interchangeably.

The chunks of information may be used and reused as a number of related or offshoot documents are generated and developed around the chunks, such as proposals, specifications, contracts, reports, presentations, media files such as video/audio, and the like. For example, a chunk can include Musical Instrument Digital Interface (MIDI) instructions, song lyrics, or a video caption, and assembled with other chunks to form a media file, such as a video file that includes lyrics. In various embodiments, methods and techniques are described that allow the offshoot documents that incorporate the chunk of information to include a reference to the underlying chunk of information, where the chunk is automatically updated within the document as the underlying chunk evolves and changes. By providing such a mechanism, more effective and efficient authoring and sharing of information may be implemented. For example, such a mechanism may allow one author to perform financial analysis of a chunk of information in a spreadsheet, while another author may wish just to insert the summary of that analysis. As the underlying chunk of information changes, each user's document may be automatically updated. As another example, while dynamically updating data can be desired in some cases, in some cases an author may wish to freeze data, for example, when producing a published report where a table that draws data from the underlying chunk must remain in sync with the commentary about the data which may only reside in the offshoot document. The various embodiments described herein enable the implementation of such scenarios. Furthermore, because the same chunk reference may be embedded within each offshoot document, more efficient search and discovery of the offshoot documents may be possible even if the actual information itself evolved over time.

In one embodiment, a local or web-based application may be implemented as a chunk management function. The chunk management function may be incorporated into an application, operate as a standalone application, operate as an add-in to an existing application, operate as a remote (e.g., cloud-based) function, or operate using a combination. The application may itself be a locally executing application or a web-based application.

In one embodiment, any portion of any document may be saved as a chunk. The chunk management function may be configured to receive input and write/read one or more chunks of data to and from shared storage. The chunk management function may further be configured to automatically generate text, data, audio, and/or images based on the chunk information and/or document information such as from user input. A document file may be created or updated containing a reference to an instance of information in a chunk stored in the storage and containing other document information.

The chunk management function may further be configured to enable the user to update the content of an instance of the chunk. Additionally, the chunk management function may be configured to allow a user to re-open a document containing references to one or more chunks of information that are maintained in storage. When the document is re-opened, the latest updates to the chunks of information may be obtained and inserted in the relevant locations in the document.

When a document is open, chunk functionality may automatically scan for chunk information and monitor the chunk information, as well as provide the capability to define new chunks when requested by the user. An interface may be provided that indicates chunks that are in use in the document, and also allows the user to identify and submit new chunks.

In some embodiments, chunks may be accessible on a conditional basis. For example, a given chunk may be available unconditionally for authorized colleagues of the originator of the chunk, may be offered for a fee to some users, and offered at a discounted rate to yet other users. Additionally, different conditions may be applied to different versions of a chunk, e.g. a paid version may be updated with certain information, or certain details may be unavailable for free versions (e.g., HD video vs. low resolution data). Chunks may also be provided with different frequencies of updates or timing of when information is released based on various payment or subscription plans.

In some embodiments, chunk references in a document file may be saved by generating a unique identifier for each chunk of information. The chunks may be stored in a data store for storing chunk information and identifying the chunk. Chunk management functionality may identify the location in the document file where a chunk should be inserted, either implicitly by the chunk being placed in sequence after other identified content, or explicitly through the specification of document location for the chunk.

In some embodiments, access requirements for chunks may be implemented. Access requirements may be implemented by individual user or by group. Access requirements may be implemented, for example, to members of organizations, subscribers to a service, users with an identified relationship to authorized users, and the like. In some embodiments, the chunk creator, rather than the document author, can release updates to chunks. For example, the chunk author may license chunks and provide different payment or subscription plans to receive updates, such as some documents receiving updates updated more frequently or earlier than others based on the license. The contents of a chunk may be verified to establish trust, e.g. by having organizations, companies, communities verify chunk information and add trusted sources. Chunk contents or entire chunks may be encrypted and include security features such as DRM.

In some embodiments, the chunk management function may provide the ability to detect that additional items within the chunk are available. For example, new items in a referenced list may be been added and updated. The chunk management function may provide the ability for the user to view, select, and insert the items from the list. The chunk management function may provide additional services, such as translating chunks and optionally storing translations in the chunk metadata.

In some embodiments, the chunk management function may provide an Application Programming Interface (API) that is configured to receive requests for chunk information and document information, and to respond to the requests. For example, the API may receive a request to retrieve all documents containing a specific chunk. The chunk management function may search for documents with the unique identifier for the chunk and return a list of the documents.

The techniques disclosed herein can improve user interaction with a computing device, which can increase a user's productivity and help reduce the number of inadvertent, obsolete, or otherwise incorrect inputs. Also, by providing more accurate and more contextually relevant information, a system can operate more efficiently with respect to the use of memory, processing resources, network resources, etc.

Having more accurate and more contextually relevant data can reduce the number of emails and other forms of communication that may be used to clarify and correct inaccurate information. Other technical effects other than those mentioned herein can also be realized from implementations of the technologies disclosed herein.

BRIEF DESCRIPTION OF THE DRAWINGS

The Detailed Description is described with reference to the accompanying figures. The same reference numbers in different figures indicates similar or identical items. References made to individual items of a plurality of items can use a reference number with a letter of a sequence of letters to refer to each individual item. Generic references to the items may use the specific reference number without the sequence of letters.

FIG. 2 illustrates an example table showing the contents of a chunk.

FIG. 3 illustrates an example table showing the contents of a chunk.

FIG. 4 illustrates an example table showing the contents of a chunk.

FIG. 5 illustrates an example table showing the contents of a chunk.

DETAILED DESCRIPTION

Figure 1:
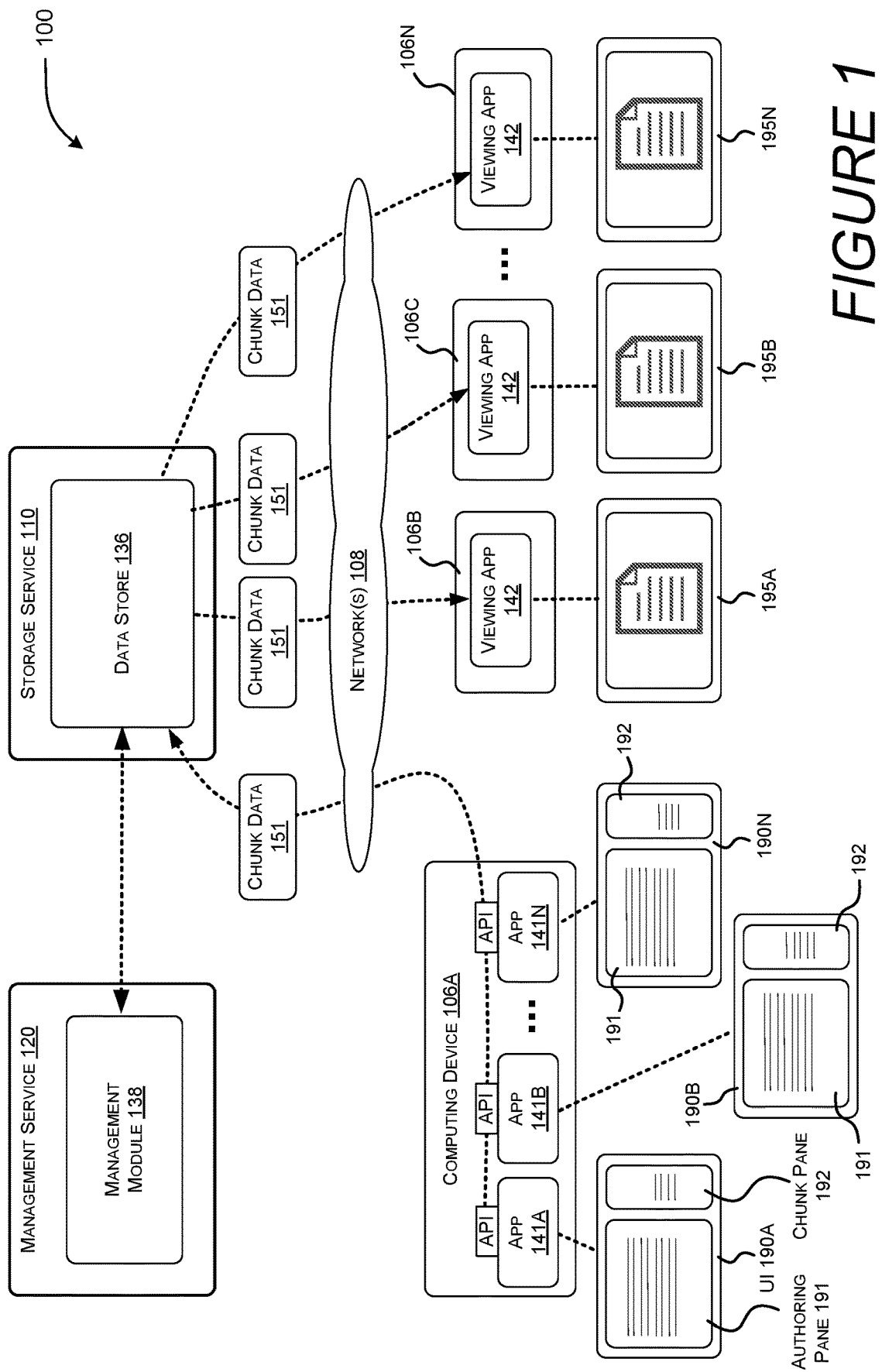
FIG. 1 illustrates a diagram illustrating the generation and use of chunks according to various embodiments.

Described herein are systems and methods for generating and using chunks of data, memes, and information in formats and schemas that allow for the re-use or extension of that information in a plurality of document types and applications. As used herein, a chunk of information, or a chunk, may generally be defined as a set of modifiable and reusable data that has associated metadata and may be uniquely identified. A chunk may further be composed of other chunks. The chunk of information may be referred to herein as a persistent data object. These terms may be used interchangeably. A chunk may include any type of data such as text, graphic, table, or any other type of information that may in inserted into a document of any type, such as a word processing document, spreadsheet, presentation, and the like.

A chunk of information as disclosed herein may be configured to be created, stored, updated, sent and received, and inserted into documents as independent objects. When inserted into documents, the chunk of information is incorporated into the document as other information may be inserted into the document such as in a cut and paste or copy and paste operation. However, the inserted chunk of information may continue to be independently identifiable and tracked. In other words, the chunk of information exists independently of the document in which it is incorporated. In one embodiment, when the chunk of information is updated, either within the inserted document, or independently in another document that may be updated by an application that may be executing in the same or a different computer, the updates may be provided to all documents that have incorporated the chunk of information, regardless of the document type and application. By providing such a mechanism, a chunk of information may be consistently used without becoming obsolete or otherwise contain stale or erroneous information. Additionally, because the chunk of information may be compatible with a plurality of document types and applications, chunks and their updates may be provided without regard to the specific type of document where they reside. Furthermore, the identity of a chunk of information may be tracked even when the contents have been updated.

As an example, a user may generate notes in a To-Do list application. The notes may then be evolved into survey questions in an Excel spreadsheet, a live survey run in an application on an iPhone, and finally into survey results in a PowerPoint presentation. A portion of the notes may be defined as a chunk that may in turn be incorporated into the Excel spreadsheet, survey, and the PowerPoint presentation. Various embodiments include mechanisms to track changes to chunks so that individual changes made to a particular chunk in one application may be applied wherever the chunk is incorporated. Furthermore, the changes may be made to the other documents based on the properties of the corresponding document types and their respective applications. In some embodiments, chunks may optionally include or be associated with functionality/logic for responding intelligently to and/or protecting edits. For example, a survey chunk can be configured to wipe results if a question is changed. The chunk may communicate with the displaying application to ensure that the application prompts the user as to whether to update the question and delete the results, or keep the results and discard the edit. Alternatively, the chunk may access or open the chunk management function to perform the user prompt.

The disclosed embodiments thus provide a way for a user to make updates in one document or application that can selectively be reflected where a chunk is used in other documents or applications. Additionally, in some embodiments the chunk may be associated with metadata such as data history and schema history. This information may be used to track the history of a chunk and its revisions. In some embodiments, the applications can each have schemas that they support, which can be declared or inferred from the context of the chunk.

For example, a To-Do list application which can support a single textual field per chunk may render "What is the Business opportunity size" as a note but may not properly render "What is the Business opportunity size SMALL|MEDIUM|LARGE" as a note, while a survey questions list in Excel that can support complex schema and multiple fields may display "What is the Business opportunity size" in one column and "SMALL|MEDIUM|LARGE" in the next column. A survey application may further recognize that the "SMALL|MEDIUM|LARGE" field is actually a multiple-response field and may render a drop-down menu to allow selection by the user.

In various embodiments, when the data in the chunk is updated or augmented, for example by changing the question or by responding to the survey, versioned data may be added to the chunk. Each of the applications and documents that use the chunk may determine whether to incorporate the new data, and also whether the application can render this new data or an older version of the data, and if so, which aspects of the schema that they can support.

Additionally, chunks of information may be rendered in a plurality of ways that are independent of a particular rendering format, as long as the type of data can be rendered. In some embodiments, a visualization platform may be implemented that provides various rendering capabilities such as graphing and charting that can render the information in a chunk without requiring any particular application to natively render the information.

In an embodiment, a computing environment that implements chunks may be implemented using one or more components. In one embodiment, the components may execute on the same physical computing device. In other embodiments, the components may be distributed, for example in a client-server architecture.

FIG. 1 illustrates a system 100 for enabling the generation, storage, and updating of chunks from multiple applications 141 and doing so while enabling a user to work within a contextual environment of each application 141. In this example, a user can interact with an individual application 141 to create and edit documents, and view and add or edit chunk content that is inserted in a particular type of file, e.g., a word processing document, a spreadsheet document, etc. The applications 141 may each be configured to display an authoring pane 191 and a chunk pane 192. The content of each file is displayed in the authoring pane 191. A user can select portions of content displayed in the authoring pane 191. The selected portions can be selected as chunks in a chunk pane 192 of any application to create and save new chunks. The chunk pane 192 may also be used to view available chunks for selection and insertion into the application. The chunk pane 192 of each application 141 may be synchronized to enable a user to work within each application 141 and view a current version of a document, e.g., a presentation, they are editing while also viewing chunk content specific to each application or available to each application.

The content in the chunk pane 192 can be used to generate chunk data 151 having content and metadata. In some configurations, the chunk data 151 can be in the form of a table, file, a multi-frame image file, a video file, or any other suitable format. In some embodiments, the chunk pane may display a tab or similar mechanism for each revision so that the user can revert back to older or newer versions. The chunk pane may also provide a mechanism to easily see the differences between revisions.

In some embodiments, a system 100 can identify or generate chunk data for use by multiple users and applications. For example, a computing device 106A or a storage service 110 and management service 120 can identify chunk content and store the chunk content.

Chunk data 151 can include text, images, media or any other form of data. The chunk data 151 can include data that is stored within storage service 110 including a data store 136 and managed by management service 120 comprising a management module 138. In some embodiments, chunk data 152 can include visualization logic that is integrated into, or linked to, the chunk data 151.

The chunk data 151 can be communicated to any number of computing devices 106, referred to herein as computing devices 106B-106N, from a first computing device 106A or the service 110 via a network 108. Each computing device 106B-106N associated with a recipient can display the chunk data 151 on a user interface 195 (195A-195N) by the use of a viewing application 142. The viewing application 142 can be any suitable application such as a presentation program, a web browser, a media player, etc. The viewing application 142 may also be a web-based application. In one embodiment, the viewing application 142 may be a virtual assistant that uses voice instead of a visual representation to convey chunk contents, e.g., facilitating text-to-speech (TTS). In some embodiments, the viewing application 142 may be an augmented reality, mixed reality, or virtual reality device and the chunk can be rendered within a virtual reality display. For example, a chunk may represent sensor data that can be updated in the background. A chunk may represent, for example, a virtual car configured in a shopping scenario that is updated on the fly and displayed in a virtual city.

It should be appreciated that the subject matter described herein may be implemented as a computer-controlled apparatus, a computer process, a computing system, or as an article of manufacture such as a computer-readable storage medium. Among many other benefits, the techniques shown herein improve efficiencies with respect to a wide range of computing resources. For instance, human interaction with a device may be improved, as the use of the techniques disclosed herein enable a user to view and edit data from a wide range of file types while operating in one application to compose a chunk that includes data from the files. In addition, improved human interaction improves other computing resources such as processor and network resources, e.g., users can work from a reduced number of applications and reduce a user's computer interaction, reduce the chances of an inadvertent input, reduce network traffic, and reduce computational cycles. The techniques disclosed herein reduce the need to download, start, maintain updates for, and toggle between, a number of applications, including a specialized presentation program. Also, instead of requiring users to copy and paste selected content into a specialized publication or presentation program, existing computer designs are improved in that all applications are synchronized and ultimately configured to improve the efficiency of a user's interactions. Other technical effects other than those mentioned herein can also be realized from implementations of the technologies disclosed herein.

In one embodiment, a storage service may be provided that is configured to manage and store chunks. In some embodiments, chunks may be implemented using tables of data. In one implementation, the data may have columns such as ID, Title, Author, and TimeDate. Each row of the table may be an instance of a chunk of information. For example, if Bob Smith is jotting ideas to obtain feedback on his sales and operations team, he may create three chunks called "Confirm receipt of goods," "Happy with sales process?" and "Likely to buy more?" The three chunks may be associated with the name Bob Smith, a timestamp of the time and date that the chunks were created, and each chunk may have different unique IDs. FIG. 2 illustrates one example table showing information pertaining to two chunks, each chunk having an ID which may conform to a globally unique identifier (GUID) scheme, a title for the chunk which may be a text string, an author of the chunk which may be a text string or some other identifier for a user, and a date/time that the chunk was modified which can be in a date and time format.

In some embodiments, additional or different columns may be included. Examples of columns may include location, type, or purpose. Additionally, columns may contain a file such as an image, video, document fragment, or an XML/HTML file. In some embodiments, a chunk of information may contain multi-dimensional data. For example, a rating column may be included which may in turn contain sub-columns for counts of 1 star, 2 stars, etc.

Multiple applications or services may read or write the data in a chunk, and allow for modifications to the schema of the data. The term "application" may refer to any application, website, add-in, SaaS service, etc. The storage service may receive information from one or more applications that are configured to receive user or system input pertaining to chunks. For example, inputs may be received via jotted notes, photos, automated insights from data analysis, insights generated from IoT sensors, etc.

The storage service may be remotely implemented such as on a server, or may be implemented on one or more devices. In some embodiments, the device providing the storage service may be separate from the device where the application is executing. The application may read and/or write data to the storage service over a network. In some implementations, the schema of the data may include a column containing a list of who has access rights. The access rights may indicate, for example, that only an authenticated user such as BobSmith@Contoso.com and FredJacoby@Contoso.com may access the data. APIs may also be exposed to allow users to request or retrieve relevant chunks, such as those that the users have access to or are engaged with because of a shared task or project.

Chunks may be created and edited using any application that is capable of receiving user inputs and processing the inputs to generate or modify information pertaining to a unit of information such as a file. In one example, chunks may be edited using a text editor such as a Notes application on a smartphone. The chunks may also be edited using any number of more complex applications such as Microsoft Excel. In an embodiment, the chunks may be saved using a relatively simple form in the storage service, even when modified using a more complex editing application.

In an embodiment, an application may be configured to allow a user to insert one of the chunks into a document file. For example, if Bob wished to create a PowerPoint presentation entitled "Measuring customer satisfaction," Bob may have an opening slide with that title, and a second slide called "Proposed Customer Survey." Bob may then indicate to the application, for example by clicking on a button in the user interface, that he wishes to re-use a chunk of information that is accessible to Bob. In one embodiment, the application may provide a list of chunks that are available for insertion. In some embodiments, the list may be sorted by parameters such as time, most recent, or may provide an option to filter the list of chunks based on a search query term, date filtering, type, or other parameters.

Some embodiments may account for the scenario where not all chunk types may work in all document types. For example, a relatively simple text editor may support chunks along with basic text editing, and in this scenario, charts or pictures may not be provided as options for insertion. In some embodiments, the application may filter to those chunk types that the application supports. For example, if a chunk that supports multiple visualizations (e.g., text or graphs), then the chunk may be allowed to be inserted, but the available visualizations may be restricted to those that are supported. In some embodiments, chunks may be accessible to users who have a subscription to one or more chunks, or who have paid a fee to access the chunk. For example, an online store may provide chunks and/or associated visualization logic for a fee. In some embodiments, an internal online store or repository may be provided for users within an organization or other entity. In scenarios that are internal to organizations where there can be a mix of internal and external chunks, the chunks may be subject to administrative controls provided by the organization. In some embodiments, a chunk may have a licensing mechanism associated with the chunk. The application may check for licensing requirements, for example when attempting to refresh the document. The application may also check for rights-based access limitations as well as other restrictions.

In one embodiment, a column may be included for a chunk that specifies the types of content that are supported, such as text, images, vector drawings, etc. In some embodiments, alternate views of the same chunk data may be provided. For example, a chunk that is an image format may be described by words or sound in addition to being rendered as an image. In some embodiments, the type of a data chunk may be strongly defined. For example, 'PLAIN-TEXT' may be a simple type, and 'AVERAGE-RATING' could be a more complex type. 'PIE CHART' could be a subtype of 'CHART'. By providing for strongly defined types, visualizations can be specialized. For example, a complex type of a chart can be rendered such as an annotated 3-D chart with statistically significant deviations highlighted, but applications may be allowed to fall back to simpler visualizations (e.g., a plain bar chart), which can be enabled by defining '3D DEVIATION CHART' as a subtype of 'CHART'. Thus, when a user wants to change a visualization, the user can initially be shown relevant subtypes, parent types, or other related types.

Continuing with the example, Bob may choose to insert the two chunks "Happy with sales process?" and "Likely to buy more?" into a customer survey slide. In further embodiments, the application may allow a user to update a given chunk and the storage service may record a snapshot of the data as the data changes. In the example shown in FIG. 3, columns are included to indicate versioning and access rights. In some embodiments, versioning may be implemented in non-linear ways. For example, different entities such as users, bots, companies, and organizations may want different versions of a chunk. In some embodiments, chunks may be versioned using a tree-like or graph-like structure where chunks may spawn multiple versions in parallel. Different branches/edges may represent different edits in parallel, leading to disconnected versions or nodes of the same chunk. Every version or node could be considered the "latest" in its representative sub-tree/sub-graph. A management tool may be provided to update chunks on individual sub-trees/sub-graphs only, e.g., when determining licensing information. The management tool may also allow for merging information in two different sub-trees/sub-graphs and creating a new node with the merged content. Furthermore, the management tool may allow for overriding a node with contents from a previous node. When a chunk is made up of other chunks, the management tool may be used to replace a chunk within the chunk with a different chunk or remove the chunk. Every edit of a chunk may be a new version. Each chunk version may be uniquely identified with an ID. In one embodiment, the differences between chunks may be stored instead of or in addition to the chunks themselves. This may facilitate efficiently tracking and checking the differences between versions, as well as save storage space. In other embodiments, multiple complete copies of various chunk versions may be stored. In one embodiment, a version may have a pointer to the previous version.

In some embodiments, a mechanism may be provided to address situations where conflicting or simultaneous edits by different authors are made to a chunk. In one embodiment, the prevailing edit may be determined as the last modified edit. In other embodiments, the conflicting or simultaneous edits may each be memorialized, tracked, and made available. For example, if a user in a marketing function and a user in a research department each modified a list, then each edit may have potential usability by different end users. Thus, a mechanism may be provided where a user may specify the attributes that can determine which edits will be provided to that user. For example, the user may want to see the last edits by someone in marketing, or they want to see the last edits by a set of named individuals, or a central administrator may define rules for selecting edits which cannot be changed by end users. Other ways may be provided to determine how conflicting or simultaneous edits may be selected.

In some embodiments, a mechanism may be provided that allows end users to be associated with attributes that determine which updates and versions of updates are accessible to a given end user and/or for a given application.

Information may be saved in the document file to connect it to the chunks of information. For example, the document file may include the following information:

```
<powerpoint>
    <slide slide_id=1>
    ...
    </slide>
    <slide slide_id=2>
        <title>
            <format font=72>
                <p>Proposed Customer Survey</p>
            </format>
        </title>
        <body>
            <format bullets=true>
                <p><information_chunk id=1273893 chunk_version=1.0>Happy with Sales Process?</information chunk></p>
                <p><information_chunk id=1273894 chunk_version=1.0>Likely to buy more?</information chunk></p>
            </format>
        </body>
    </slide>
</powerpoint>
```

In the example illustrated above, the second slide now contains a reference to the chunk storage service. For example, the tag "<information_chunk id=1273893 chunk_version=1.0>Happy with Sales Process?</information chunk>" indicates the chunk identifier and the version. Additionally, the tags refer to two older chunks of data (version 1.0) which will then be retrieved from the chunk storage service and inserted into the document. In one embodiment, the location of the storage service may be assumed to be known to the applications that attempt to open the document. For example, Microsoft Office applications may have built-in knowledge of the URL or other link to the storage service for chunks that are available to Microsoft Office applications. Additionally, Microsoft Office applications may have built-in knowledge of authentication methods for accessing the storage service. In other embodiments, the source may be explicitly stated as a property within the document file.

In some embodiments, the storage service may store groups of items which were originally authored to be part of a coherent list. Examples may include a sequential set of photos, a set of tasks all of which are placed on the same board, and a set of bullets from a presentation slide. The ability to group items in sets may be beneficial when reusing information in chunks, when the information is to be used as a set. Additionally, users of the sets of chunks may benefit by being notified when new items are added to a set, or when existing items in a set are deleted.

In one embodiment, a grouping mechanism may be implemented in the storage service by having each row of information include a shared attribute value. For example, the shared attribute may be the parent location URL as shown in the example table in FIG. 4. The shared attribute may also be indicative of an order, for example, of which item in the list is part of a given chunk.

In some embodiments, the level of granularity of the chunks may vary. For example, each row of a list of chunks in the storage service may be a full list or a full table, and methods may be provided for the author (or other user) to retrieve certain items from each chunk. While a chunk may be retrievable, the reference in the document where the chunk is inserted may refer to chunk items rather than the chunks themselves, as shown in the example below.

```
<body>
    <format bullets=true>
        <information_chunk id=1273893 chunk_version=1.0 items=all>
        <p>Happy with Sales Process?</p>
        <p>Likely to buy more?</information chunk></p>
        </information_chunk>
    </format>
</body>
```

In an embodiment, applications which can process the document file may be able to perform operations when re-opening the document. For example, an application may be running on a computer device which is unable to connect over the network to the storage service (which may be referred to as "offline support"). In this case, the application may still able to read the static copy of the information from the document file so that the application can display the version of the chunk as saved in the document. In one example, the reason for the storage service being unavailable is that a different user may have opened the application who has not been granted access to the storage service. In some embodiments, the application may provide a notification to the user, for example by rendering a notification bar which displays "This document contains live information chunks. To view the latest version, click here to request access." In response to clicking the request, the user may be taken to a different application or webpage where they can request access control to the storage service.

In one embodiment, if a user does not have access to the online data, then restrictions may be implemented to restrict allowing the unauthorized user from viewing the data offline as well. In some embodiments, access rights to the data may be included as one of the items optionally stored with the chunk. The access rights may be implemented to prevent the showing of the content if the access is insufficient. In some implementations, IRM or DRM may be applied to the inline content of the chunk to ensure the user doesn't otherwise hack the document to access the content. In some embodiments, chunk contents may be encrypted. Additionally, IRM or DRM mechanisms may be inherited or transferred as chunks or portions of chunks are shared or forwarded. Other methods may be implemented for visual or audio files such as watermarking when chunks are printed or copied (e.g., screenshotted). In some embodiments, chunk content may not be included in the document so that without online access, the missing chunk content will result in missing content in the document. For example, if there are concerns around access to the data, ensuring that the data is retrieved from the server by an authenticated user can ensure access controls are met. Additionally, a record of the access can be captured and stored.

When the application user does have access to the storage service or at least the desired chunk, the application may send a request to the storage service querying if a newer version of the chunk is available, or if items from the same location have been added or removed. In some embodiments, the application may provide the user with a prompt asking if they wish to update their document so that it contains all the latest versions of any inserted chunks. In other embodiments, the document may auto-refresh. In some embodiments, devices or applications may continuously or periodically poll the remote data store as to whether there are any updates. In one embodiment, the device or application may notify the storage service when it opens and closes the document and what chunks it contains so that the storage service can then send updates when they occur if the document is open. In still further embodiments, the user may explicitly set a property so that the document does not auto-refresh for other users or based on other conditions. For example, if a published report references demographic data for a given quarter, it may not be desirable for a user to open the document a year later when the demographic data has changed considerably. The findings in the report (which may be multiple pages of textual discourse) may wrongly reference observations about the demographic data that were valid a year ago but are no longer valid with the most up-to-date (latest version) demographic data. In still further embodiments, textual analysis may be performed against the document to identify where the document references older versions of the chunks so that those parts of the document may be highlighted for revision by the user.

In an embodiment, an application may be configured to allow the user to directly edit the chunks within the application. Chunks that are edited within one application may be used across multiple applications and in multiple documents, even where the context in which the information is used may be different. In some embodiments, edits that were made to a chunk using one application may be applied to other applications and documents. Features may be implemented to limit or prevent propagation of changes in scenarios where the changes are inapplicable. For example, if the chunk is a presentation slide that summarizes sales for a quarter (and is used in a plurality of presentations across the organization), the chunk may make sense within this context and updates may be propagated. In another example, if the chunk is a table containing survey results such as the percentage of respondents who agree with a set of questions, then the table may also make sense to re-use. If the difference between versions of the chunks is minor rewording of sentences, it may make sense to apply edits across documents where the chunk is used.

When chunks are edited, additional properties may be added as columns that are associated with the chunk. For example, as shown in the example in FIG. 5, Fred may turn the customer service bulleted ideas into a customer survey (note that author, modified, access rights, parent location are removed for brevity only).

In some cases, older documents may have chunks that are locked to specific versions so that some data does not update in documents that have locked chunks. The example in FIG. 5 shows that "Sales process satisfaction" includes two versions 1.0 and 1.1. This may be useful when documents are historical and intended to include information from a point in time that is not to be updated. When a more recent change is made to the chunk, the changes may not be applied to the locked data in the older or historical documents. In one embodiment, a mechanism may be implemented that is configured to receive updates to the chunk and to bypass documents that have incorporated the chunks but are "frozen." In one embodiment, only data from external sources may be frozen. In another embodiment, a mechanism may be implemented to access previous versions for updating. In further embodiments, a mechanism may be provided to save an update to all old copies.

In one embodiment, a mechanism may be implemented that determines whether an update is significant based on one or more factors that can be defined by users of a chunk. Insignificant updates or updates that are otherwise deemed unnecessary to a particular instance of a chunk can be bypassed. For example, the user may be prompted to select whether an update should be propagated. Additionally, a mechanism may be implemented to allow updates to be disabled, for example where changing historical legal filings may be prohibited. In one embodiment, an application may show all usages of a chunk in any of its versions and allow for approval for updating of each "version/document"-pair that are used in the document.

In the example above, additional columns may be added to capture how users respond to the survey. The type of information may evolve from a more simple or linear representation to one that is more complex. In some implementations, sub-types may be generated and included in the chunk, for example "survey/customer satisfaction" (in contrast to "survey/lunch options" or "survey/idea voting"). Thus semantic annotations may be used to provide visualizations.

In some of the examples detailed herein, the original content of the chunk is a 'topic' and new content may be directed to a question. In other examples, the original content may be context-neutral, but the new list content may be context-specific. As such, a variety of heuristics may be used by the application or survey to determine whether to request explicit input from the user before applying updates or whether updates should be applied automatically. For example, heuristics may include but are not limited to: the character edit distance before and after, whether the type of chunk has changed, the quantity of increased items, whether a chunk is purely numeric, whether the change is an updated photograph file, whether a chunk is a presentation slide, whether a chunk has introduced significant quantity of new columns, whether the semantic type of the chunk is deemed similar to what is already being used in the document, whether a convertor exists to modify the latest chunk type (e.g. survey) into the type which is present in the document (e.g. simplex), whether the chunk consists solely of data retrieved from a connection to an external source, e.g. SQL database or website, and the like. In an embodiment, a mechanism may be provided in which third parties can sign and lock chunks and thus prevent them from being changed by others, potentially including the owner of the chunk. Additionally, metadata may be modified indicating that a chunk or its specific contents were changed.

In one embodiment, the following sequence for updating chunks may be implemented: when the user makes an update to a chunk in the context of one document (or one application), the data may be always saved in the storage. When a second document referencing the chunk or a second application reading data from the chunk is launched, or in the case of co-authored documents, when an update is detected, then a determination may be made whether to (1) update the chunk in the document to use the latest version of the chunk automatically, or (2) notify the user that a change has been made that they may wish to accept, and whether to accept or ignore the change.

Not all applications may support providing notifications to the user of updates to chunks. For example, a simple phone application which includes a notetaking function may not be configured to provide a notification platform. Additionally, not all applications may contain logic capable of determining which version of the chunk to use. In such cases, the computational logic to determine which version of the chunk to provide to a particular device or application may be performed on a server which may be network-connected to the storage or co-located with it. This may allow the phone application and its interfaces to the storage service to remain relatively simple. For example, the application may simply perform tasks for reading/writing to a list. The complex tasks of transforming and handling updates may be performed on the server. The server may be configured to perform update processing in a variety of scenarios that are not limited to phone applications.

With chunks saved in a storage service independent of individual user devices, the chunks may be exposed to a broader set of applications and users. In some embodiments, users and applications can query the storage service for relevant chunks. For example, chunks created in the same parent location or created by the same author in a given timeframe may be queried and retrieved. In such cases, the input parameters may be provided by the application or user and the results may be filtered to direct matches. As the use of chunks increase, chunk retrieval mechanisms may be implemented that may incorporate search engine techniques, where queries such as "show me all recently authored or updated chunks containing the keyword 'customer'" may rely on standard information retrieval (IR) practices to find those chunks which contain larger numbers of mentions of the keyword "customer." As such, the query may return sorted results by assigning a sub-score for how recently authored a chunk is, and another sub-score for how many times the chunk contains "customer." The two sub-scores may be combined (e.g., summed) to compute how relevant a given chunk is. Other scenarios such as how often a given chunk is re-used, and whether the chunk is re-used by known contacts or within an organization or team, may be additional factors used to rank query results for chunks, for example. More generally, the chunk storage and management service may be integrated with a query engine (e.g., a search crawler for enterprise search scenarios, or a database-like query for programmatic queries). In some embodiments, the visualization logic associated with a chunk, or other functionality, can be configured to translate any type of rich metadata into plain text to facilitate free text searching. Additionally, in conjunction with searches for chunks, a user may be provided the ability to select a chunk and be provided a list of similar chunks. In some embodiments, the list may be biased using a determined relevance based on social network data, previous searches, the current application, and other factors. Chunks may be indexed to facilitate being subjected to searches.

In various embodiments, a mechanism may be provided to render chunks of information. The chunks may be rendered within the context of an application, or independently of an application. For example, chunks from the chunk storage service may be queried and rendered for review, or a chunk may be reviewed within an application.

In some embodiments, applications may be configured to render the chunk of information. The chunk may be rendered based on the type of information that it contains, as well as properties of the chunk as indicated by its metadata, which can be used to determine how the information is rendered. Some of the metadata associated with a chunk (e.g., author, timedate, version, parent location, item, etc.) may not affect how the information is rendered in a document. Other properties such as the title or an associated image file may be used for rendering. For example, the application may render text as a plain text or may render an image within the document, wherever the user inserted the chunk in a document. If the original application (e.g., a phone note-taking application) is relaunched, then the original application may directly use the chunk(s) and not have any document content surrounding the chunk. The application may also render the chunk as text with metadata. In some embodiments, a mechanism or interface for changing between versions may be provided.

In some embodiments, a visualization mechanism for viewing, editing, and otherwise accessing chunks may be incorporated into an application. Alternatively or additionally, the visualization mechanism may be implemented as a standalone application or process. In some embodiments, the chunks may include or be linked to logic that enables an application to render the chunk information without the need for pre-existing functionality in the application or locally on the user device. In some embodiments, the logic may be configured to allow visualization of the chunk content. In one embodiment, the logic can provide a basic visualization for applications that are not configured to otherwise visualize the content of the chunk.

The associated chunk visualization logic may be implemented as code that can run on the user device or at the storage service when visualization is needed. For example, if the data in the chunk is a table, and the local device is attempting to visualize the table using Notepad, then the table may be rendered using logic provided for the chunk. The logic may be co-located with the chunk at the storage service, or available for download to the user device. Otherwise, the Notepad application may render the table using its limited rendering capabilities. For example, the contents of the table may be rendered as a list with delimiters.

In order to facilitate the implementation of chunks in various applications, the applications may conform to a standard interface for enabling the various techniques described herein. The standard interface may include a set of rules and interfaces that each application must adhere to in order to be able to use a chunk regardless of its originating application and context. In some embodiments, add-ins that incorporate visualization and chunk management functionality may be implemented and made available to enable applications to use chunks within their documents.

In some embodiments, applications may override the base representation provided by the associated logic for a chunk. For example, the application may invoke another application to render the chunk data, such as a browser. The browser may then be used to render the chunk information according to the browser's capabilities. The application that is using the chunk may thus rely upon the browser or other application to render the chunk for visualization by the user.

The logic may provide various capabilities, such as versioning and support for editing chunks. Furthermore, the logic may provide a user with the ability to visualize and provide input regarding the usage of the chunk. For example, when the originator of a chunk changes the data in the chunk, the current user may be provided a notification of the change, and further may be provided a choice whether to incorporate the change. Additionally, the current user may be provided a notification of a change in visualization logic, and further may be provided a choice whether to update the visualization logic.

In some embodiments, the logic may be associated with the class that the chunk belongs to. For example, various classes of chunks may be defined, such as a "table chunk" class for chunks that have information in tabular form and is intended to be used in documents that include tables. The class and its associated logic may define a core representation for the class. In some embodiments, the logic may be stored with the chunks at the storage service. The logic may be sent along with the chunk when requested by an application. In other embodiments, the logic for various classes may be stored at another location, for example at a master storage location for chunk visualization logic. In some embodiments, the logic for various chunk classes may be available via a URL. In one embodiment, users may define and submit their own chunk types through, for example, an online store or other centralized repository.

When the logic for various chunk classes are predefined and available for download and use, when a chunk is generated, the logic does not need to be generated. The originating application only needs to generate the metadata for the instance, such as the title, the type of information in the chunk, who can access the chunk, the author, time/date stamp, class, and how to render the class (e.g., where to obtain the logic). In some embodiments, chunk-specific logic may be available in addition to class-specific logic. For example, the class-specific logic for a table may be overridden for a particular table. In one embodiment, this can be achieved by applying the base display logic and layering on the custom logic, or by only applying the custom logic. There may be some applications that do not support the custom logic, in which case the logic can fall back to the default logic for that chunk type or class. The custom logic may also provide other visualization options such as those described herein. In some embodiments, multiple sets of logic may be associated with a chunk specifying different visualizations or different ways of editing the chunk.

In some embodiments, users may be presented with a number of available visualization options. Each visualization option may have their own logic and can process the data for the chunk and generate a rendering. The types of renderings can range from pure text, pure graphics, and any other type or combination of renderings. In some embodiments, purely graphic oriented applications may be able to render a variety of chunk types. For example, a Paint application may be able to render a table graphically, even if editing capabilities may not be provided. In some embodiments, the visualization logic may define how to render chunks if other chunks are also present in the document.

In some embodiments, a ranked list of visualizations may be provided, for example a list of the most popular visualization options. The list may be provided as a text rendering. In another example, a graphical output may be generated that shows an animation depicting a rotating carousel with the most popular visualizations. In one embodiment, each visualization in the list may have a preview of the type of rendering that will be provided with that visualization, which the user may select.

In an embodiment, the list may be selected or prioritized based on one or more factors including:
   Which visualization was last used to render the chunk
   What is the strong type of the chunk
   Which visualizations are related to that type (fully or partially)
   Which visualizations is the user licensed for In some embodiments, the user may be provided the capability to filter the visualizations based on capabilities (e.g., edit vs. read only, black & white vs. color theming).

Figure 6:
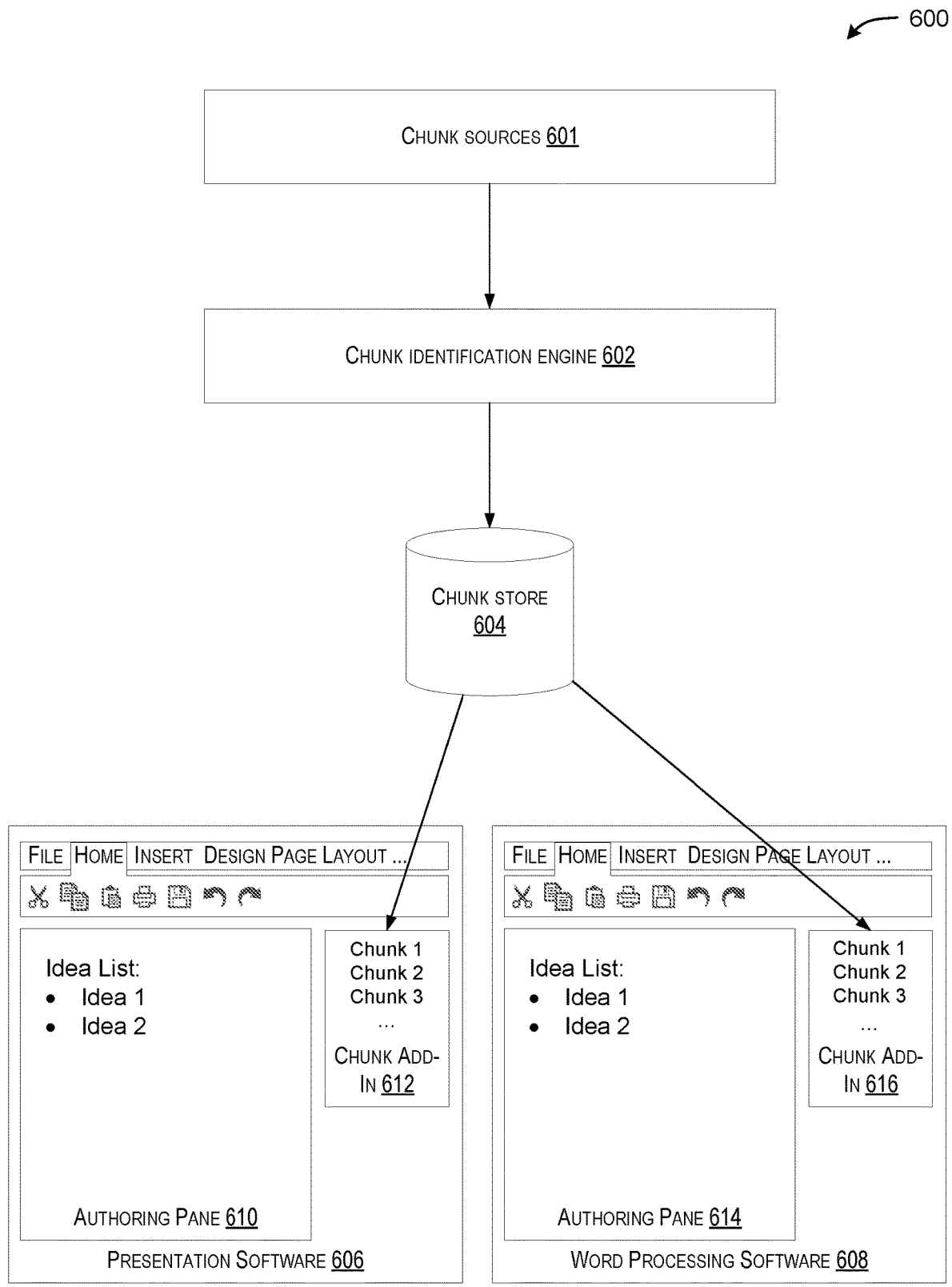
FIG. 6 illustrates a block diagram for identifying chunks and providing them to an application.

In some scenarios, the only available visualizations in an application (e.g., Notepad) may be able to facilitate the rendering of information, but not its editing. For example, a star rating can be shown, but since its data comprises a list of all previous submitted ratings with the total being averaged, there may be no way for a user to edit that data in Notepad without losing the underlying ratings data. In such scenarios, an application may notify the user that a given chunk of data is not editable by the user or that editing will result in data loss. Alternatively, the application may not allow the chunk to be edited without an explicit notification (e.g., editing functions may be disabled). FIG. 6 illustrates a block diagram 600 for identifying chunks, storing chunks, and providing the chunks to an application. In some embodiments, chunk sources 601 may include documents, emails, spreadsheets, presentations, graphics files, and the like. These documents may be accessed via a network by chunk identification engine 602. Chunk identification engine 602 may receive chunks, including metadata associated with the chunks, to associate chunks with metadata and related rendering logic. In some embodiments, chunks may be stored in chunk store 604, which may be implemented by a storage service as discussed herein.

In some embodiments, chunks stored in chunk store 604 may be retrieved by software applications, such as presentation software 606 or word processing software 608. These applications may be configured to include authoring panes 610 and 614 in which main document content is displayed. Applications 606 and 608 may also include chunk add-ins 612 and 616. In some embodiments, the chunk add-ins may receive chunks and insert portions of the chunk information in documents being edited by applications 606 and 608 and displayed in authoring panes 610 and 614. In other embodiments, the functionality provided by add-ins may be included in the functionality of the applications.

Figure 7:
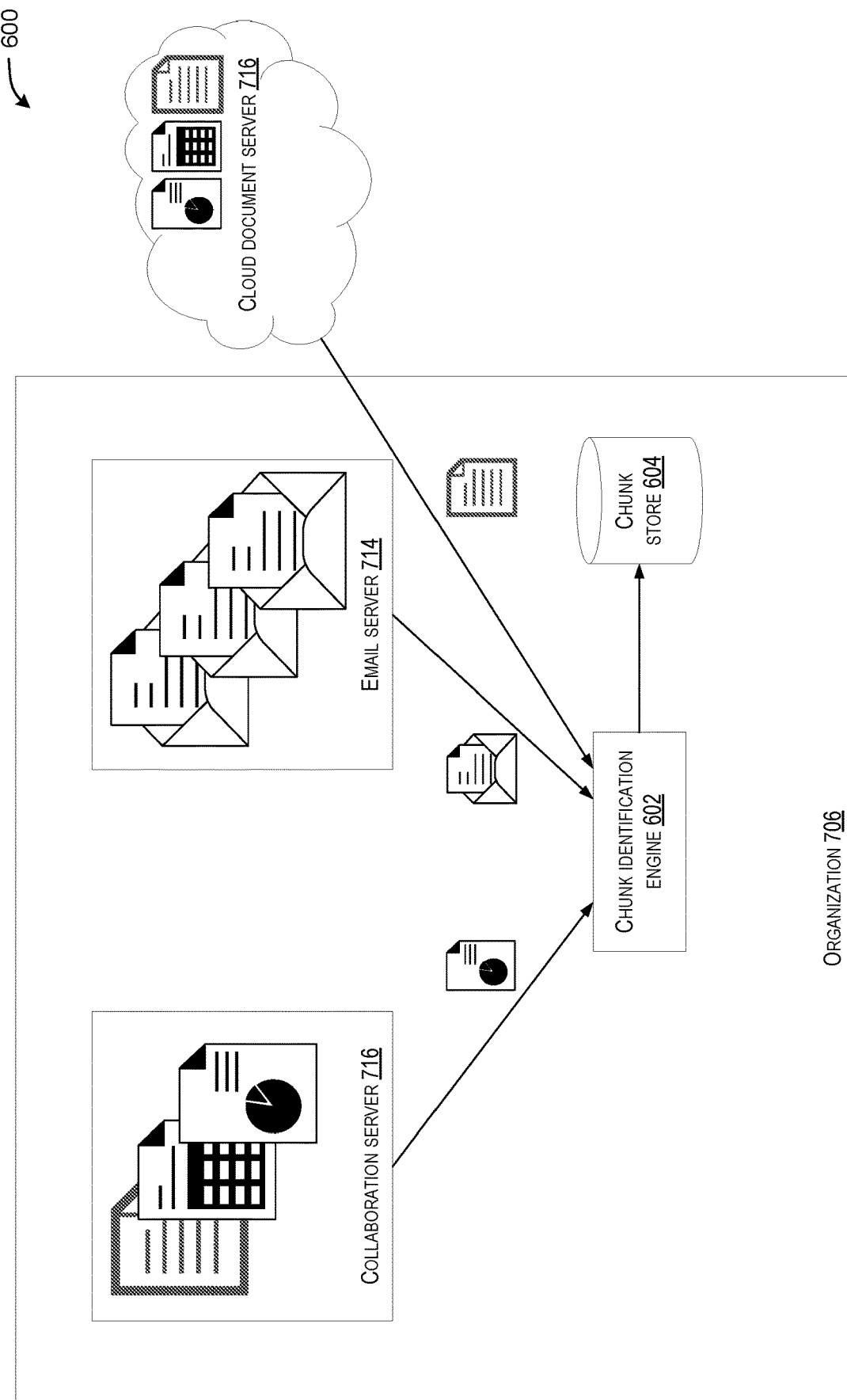
FIG. 7 illustrates a block diagram for identifying chunks and providing them in an organization.

FIG. 7 illustrates a block diagram 700 for generating, storing, and re-using chunks in conjunction with a team or organization 706. In some embodiments, chunk identification engine 602 receives chunks to be processed from collaboration server 716, email server 714, cloud document server 716, or the like. In some embodiments, the chunks stored on these servers are associated with organization 706. This enables chunks to be identified that are particular to organization 706.

For example, collaboration server 716 may store slide presentations, spreadsheets, word processing documents, emails, calendar appointments, or the like. In some embodiments, chunk identification engine 602 may have access to retrieve the documents stored in collaboration server 716. Additionally or alternatively, collaboration server 716 may provide stored documents to chunk identification engine 602. Chunk identification engine 602 may also be implemented as an add-in executing within collaboration server 716.

Chunk identification engine 602 may similarly receive artifacts from email server 714. These artifacts may include emails, attachments, or any other type of document.

In some embodiments, while cloud document server 716 exists physically outside of organization 706, the documents contained thereon may still be considered part of the organization.

Figure 8:
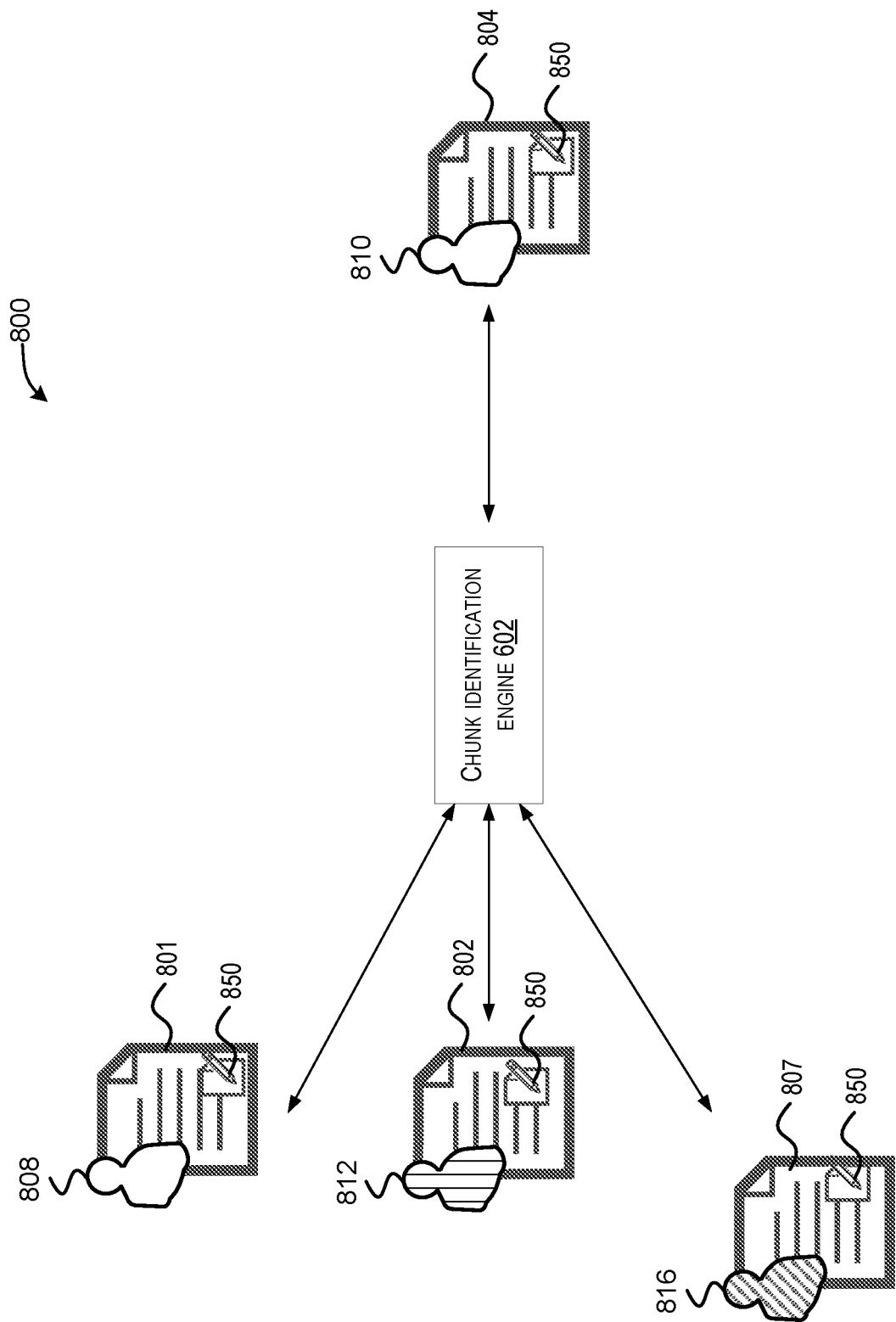
FIG. 8 illustrates a block diagram for updating chunks.

FIG. 8 illustrates a block diagram 800 showing how a chunk is updated by various users and updates provided to users. In some embodiments, chunk identification engine 602 is configured to track chunk 850 that is inserted in document 801, document 802, document 804 and document 807. These documents have associated users 808, 810, 812, and 816.

In some embodiments, as document 802, document 804, and document 806 are being updated, when their respective inserted chunks 850 are updated, the updates may be received by chunk identification engine 602 and document 802, document 804, and document 806 may each be notified of any updates to the chunk and/or its associated visualization logic. In this example, document 804 associated with user 810 may not currently be in use. However, chunk identification engine 602 may track the updates to chunk 850 and when document 804 is later opened, chunk identification engine 602 may send the document 804 the accumulated updates.

Figure 9:
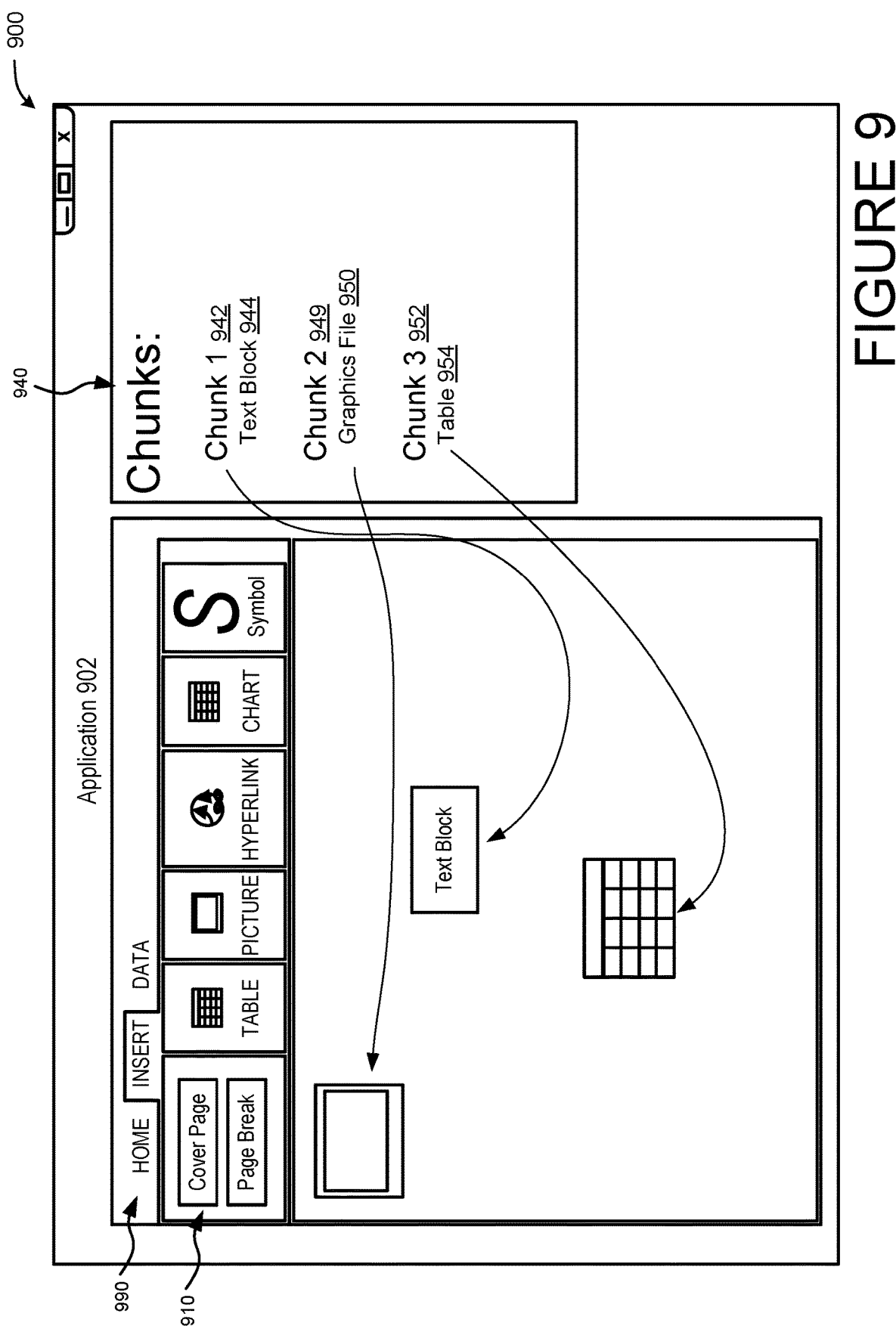
FIG. 9 illustrates a block diagram for updating chunks.

FIG. 9 shows a document-based application 900 including a chunk visualization pane 940 for chunks that are inserted in the document. In one embodiment, application 900 executes on computing device 902, and includes a document-based application including a menu 910, a document authoring pane 990, and a chunk visualization pane 940.

Chunk visualization pane 940 lists three chunks found in the document: chunk 1 942, chunk 2 949, and chunk 3 952, with arrows associating the chunks with one or more instances of the chunks being used in the document.

Figure 10:
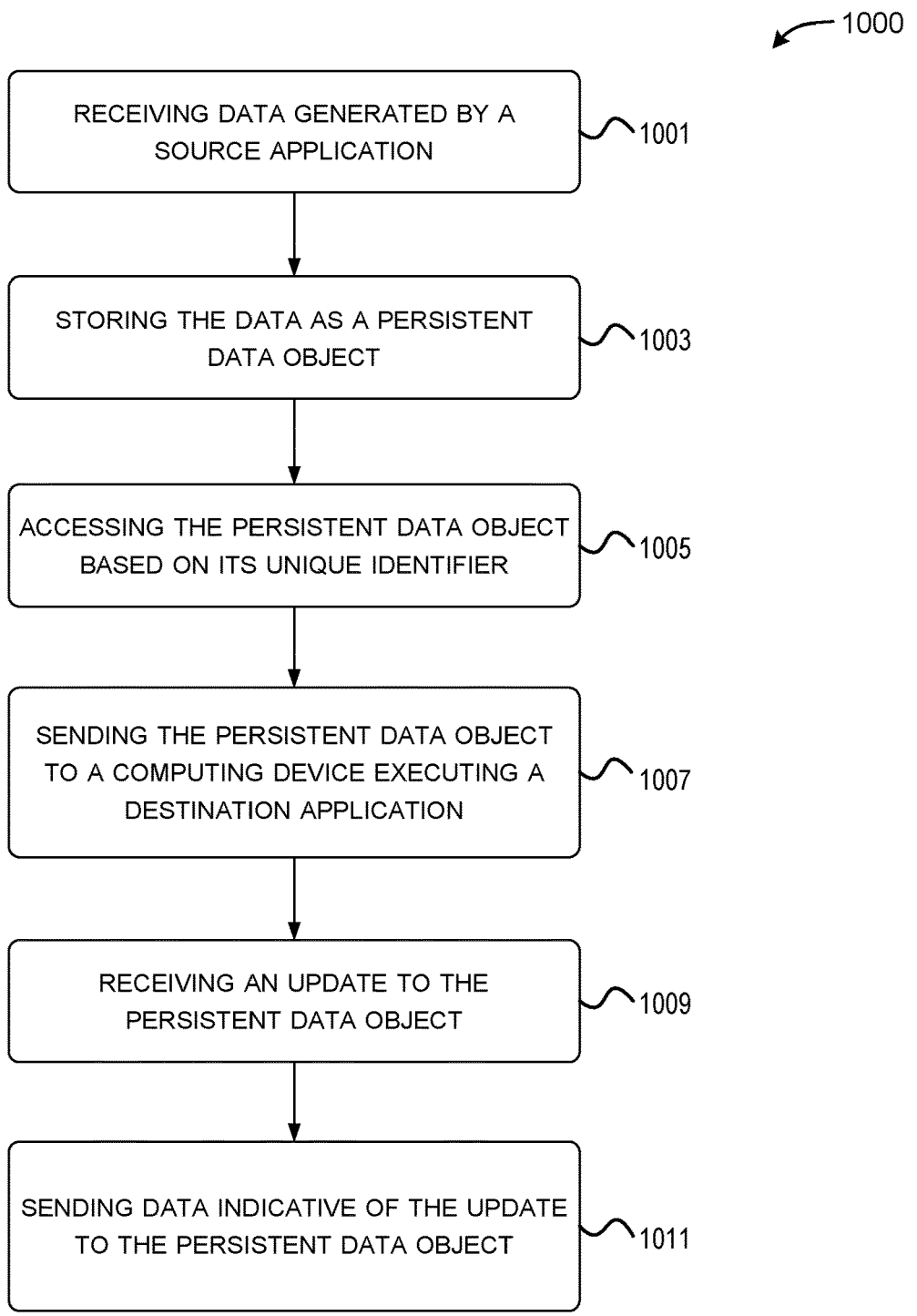
FIG. 10 illustrates aspects of a routine for enabling aspects of the techniques disclosed herein as shown and described below.

FIG. 10 illustrates aspects of a routine 1000 for enabling aspects of the techniques disclosed herein as shown and described below. It should be understood that the operations of the methods disclosed herein are not presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 1000 are described herein as being implemented, at least in part, by modules running the features disclosed herein and can be a dynamically linked library (DLL), a statically linked library, functionality produced by an application programing interface (API), a compiled program, an interpreted program, a script or any other executable set of instructions. Data can be stored in a data structure in one or more memory components. Data can be retrieved from the data structure by addressing links or references to the data structure.

Although the following illustration refers to the components of the figures, it can be appreciated that the operations of the routine 1000 may be also implemented in many other ways. For example, the routine 1000 may be implemented, at least in part, by a processor of another remote computer or a local circuit. In addition, one or more of the operations of the routine 1000 may alternatively or additionally be implemented, at least in part, by a chipset working alone or in conjunction with other software modules. In the example described below, one or more modules of a computing system can receive and/or process the data disclosed herein. Any service, circuit or application suitable for providing the techniques disclosed herein can be used in operations described herein.

Figure 13:
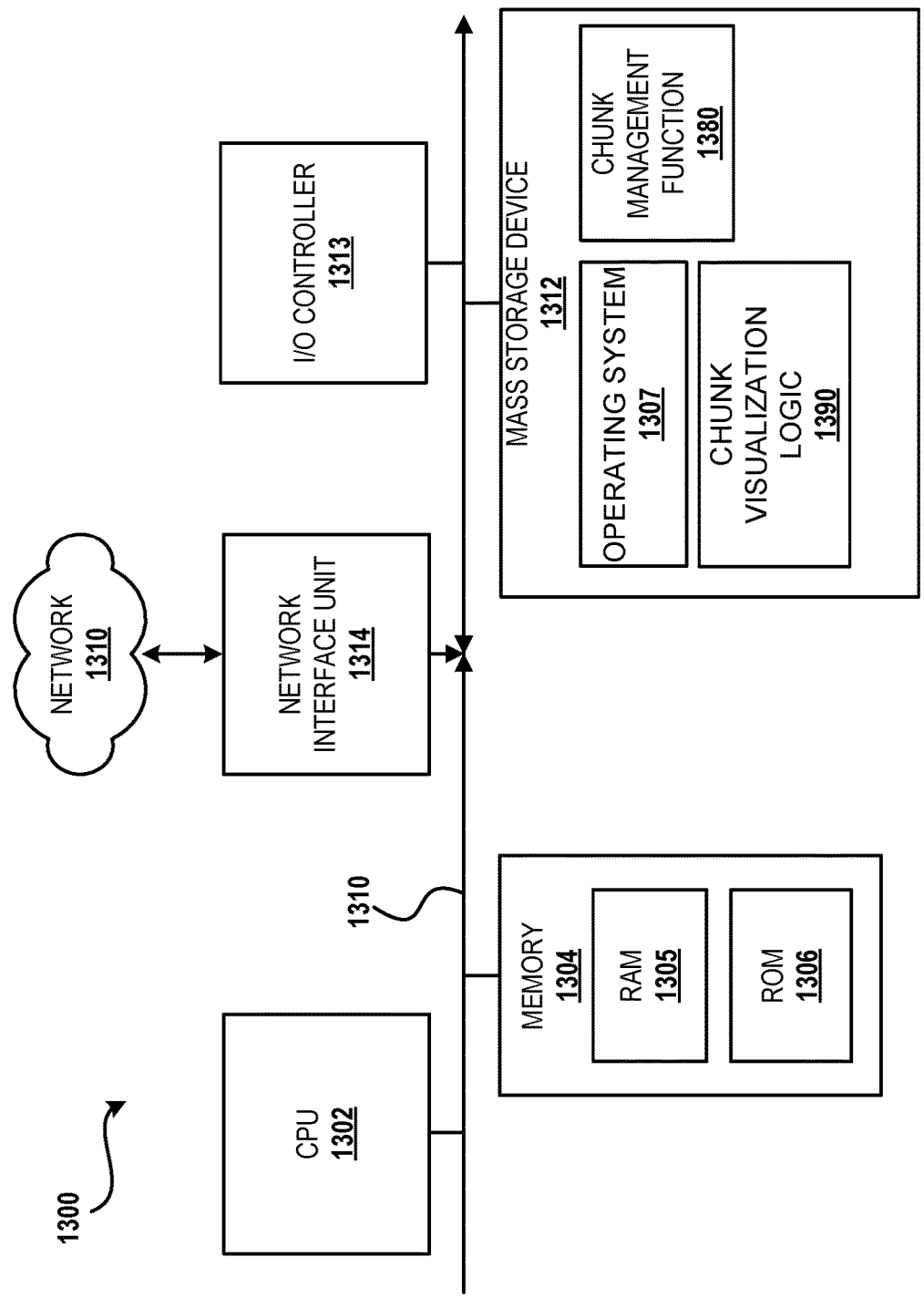
FIG. 13 is a computer architecture diagram illustrating an illustrative computer hardware and software architecture for a computing system capable of implementing aspects of the techniques and technologies presented herein.

The operations in FIG. 10 can be performed, for example, by the computing device 1300 of FIG. 13, as described above with respect to any one of FIGS. 1-9.

At operation 1001, data generated by a source application is received at a data store.

At operation 1003, the data is stored as a persistent data object that is configured to be compatible with a plurality of applications and document types. In an embodiment, the persistent data object is associated with a unique identifier.

At operation 1005, in response to a request for the persistent data object, the persistent data object is accessed based on its unique identifier.

At operation 1007, the persistent data object is sent to a computing device executing a destination application. In an embodiment, the persistent data object is incorporated by and is compatible with a destination document being edited by the destination application.

At operation 1009, an update to the persistent data object is received from a user computing device. In an embodiment, the update is generated by a user application editing a user document on the user computing device.

At operation 1011, in response to receiving an indication that the persistent data object has been inserted in the destination document by the destination computing device, data indicative of the update to the persistent data object is sent by the data store to the destination computing device. In an embodiment, the data is usable to update the persistent data object as incorporated in the destination document. In some embodiments, data indicative of the updated persistent data object may be sent to a plurality of devices, applications, or documents that have incorporated or used the persistent data object prior to the update.

In some embodiments, the persistent data object is associated with a class. The class may be associated with logic that is operable to enable the destination computing device to render the data independently of rendering capabilities of the destination application.

In some embodiments, a subset of the persistent data object may be operable to be inserted in the destination document.

In some embodiments, data indicative of the updated persistent data object is sent to a plurality of devices, applications, or documents that have incorporated or used the persistent data object prior to the update.

In some embodiments, the persistent data object is associated with a license that enables access to the persistent data object.

In some embodiments, the data store may be configured to store persistent data objects from a plurality of sources.

In some embodiments, the persistent data object may be further associated with metadata indicative of one or more of an author, data/time stamp, version, and title. The persistent data object may also be associated with metadata indicative of users who are authorized to view or edit the persistent data object. In an embodiment, persistent data objects may be stored as a table, with each row of the table corresponding to one of the persistent data objects.

In some embodiments, updates to the persistent data object are selectively sent to the destination computing device based at least in part on attributes associated with the persistent data object.

In some embodiments, the destination document may be automatically updated when the persistent data object is updated. The destination document may be automatically updated based on a user option. In some embodiments, a notification may be provided when the persistent data object is updated.

In some embodiments, the persistent data object may be associated with a grouping mechanism. Additionally, the persistent data object may be associated with a shared attribute value that indicates which group the persistent data object belongs to.

In some embodiments, the persistent data object is provided in a flattened format for applications. For example the application may not support complex data formats.

In some embodiments, the destination document is prevented from being updated based on a user selection when the persistent data object is updated.

In some embodiments, the persistent data object is further associated with metadata indicative of users who are authorized to view or edit the persistent data object.

Figure 11:
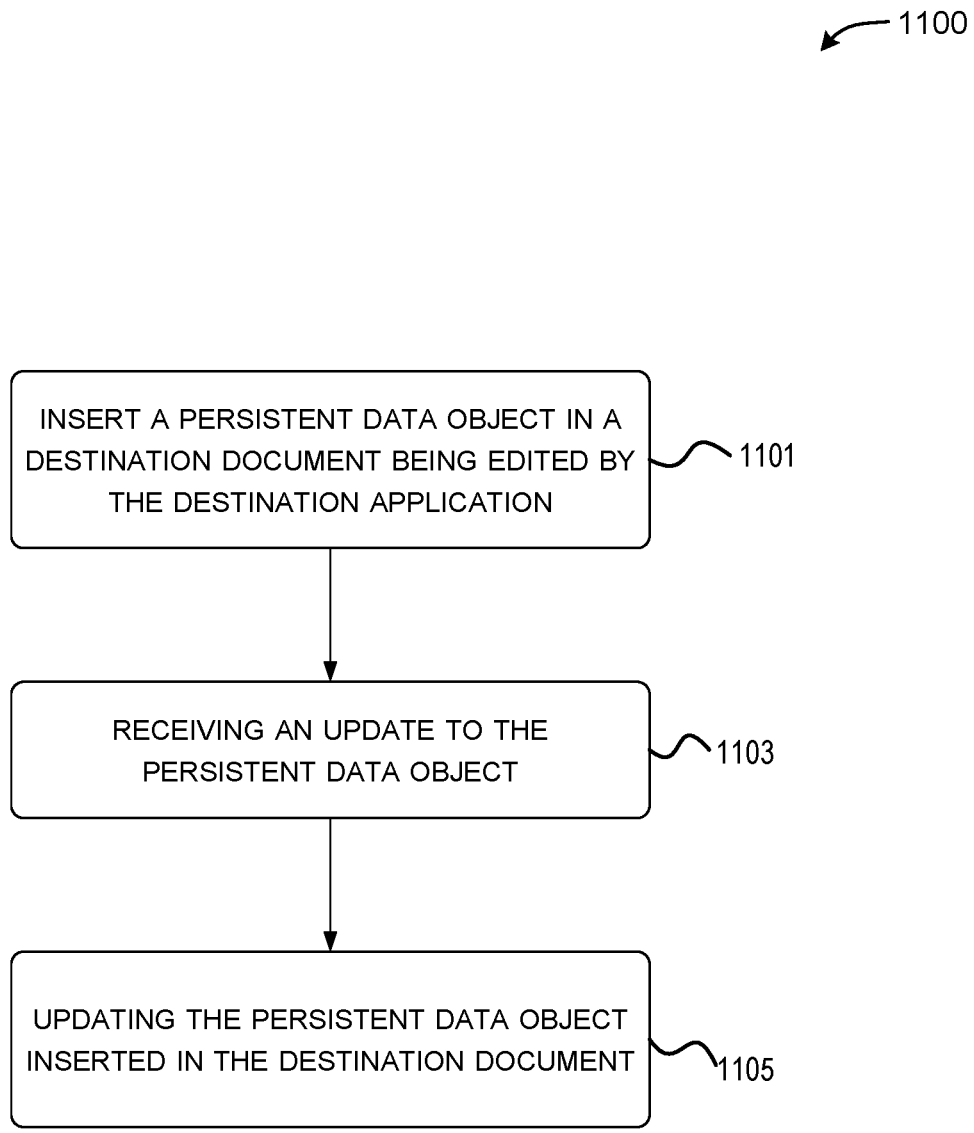
FIG. 11 illustrates aspects of a routine for enabling aspects of the techniques disclosed herein as shown and described below.

FIG. 11 illustrates aspects of a routine 1100 for enabling aspects of the techniques disclosed herein as shown and described below. The operations in FIG. 11 can be performed, for example, by the computing device 1300 of FIG. 13, as described above with respect to any one of FIGS. 1-9.

At operation 1101, a persistent data object may be inserted, by a destination application executing on the computing device, in a destination document being edited by the destination application. In an embodiment, the persistent data object may be configured to be compatible with a plurality of applications and document types.

At operation 1103, an update to the persistent data object is received. In an embodiment, the update may be generated by a user application editing a user document on a user computing device.

At operation 1105, in response to receiving the update to the persistent data object, the persistent data object inserted in the destination document may be updated by the destination application.

In some embodiments, the persistent data object may be received from a data store configured to store persistent data objects from a plurality of sources. The persistent data object may be originally generated by a source application running on a source computing device. Additionally, generated persistent data object may be sent to a remote data store configured to store a plurality of persistent data objects.

In some embodiments, the destination application may be configured to process the persistent data object to render a representation of the persistent data object. The representation may include one or more of an author, data/time stamp, version, and title. Additionally, the version may comprise a plurality of versions of the persistent data object, and wherein an option is provided to select one of the versions for incorporation into the destination document.

In some embodiments, the destination application is allowed to lock a specific timeframe of an instance of information in the persistent data object. Additionally, external updates to the persistent data object may not be received by the destination document.

Figure 12:
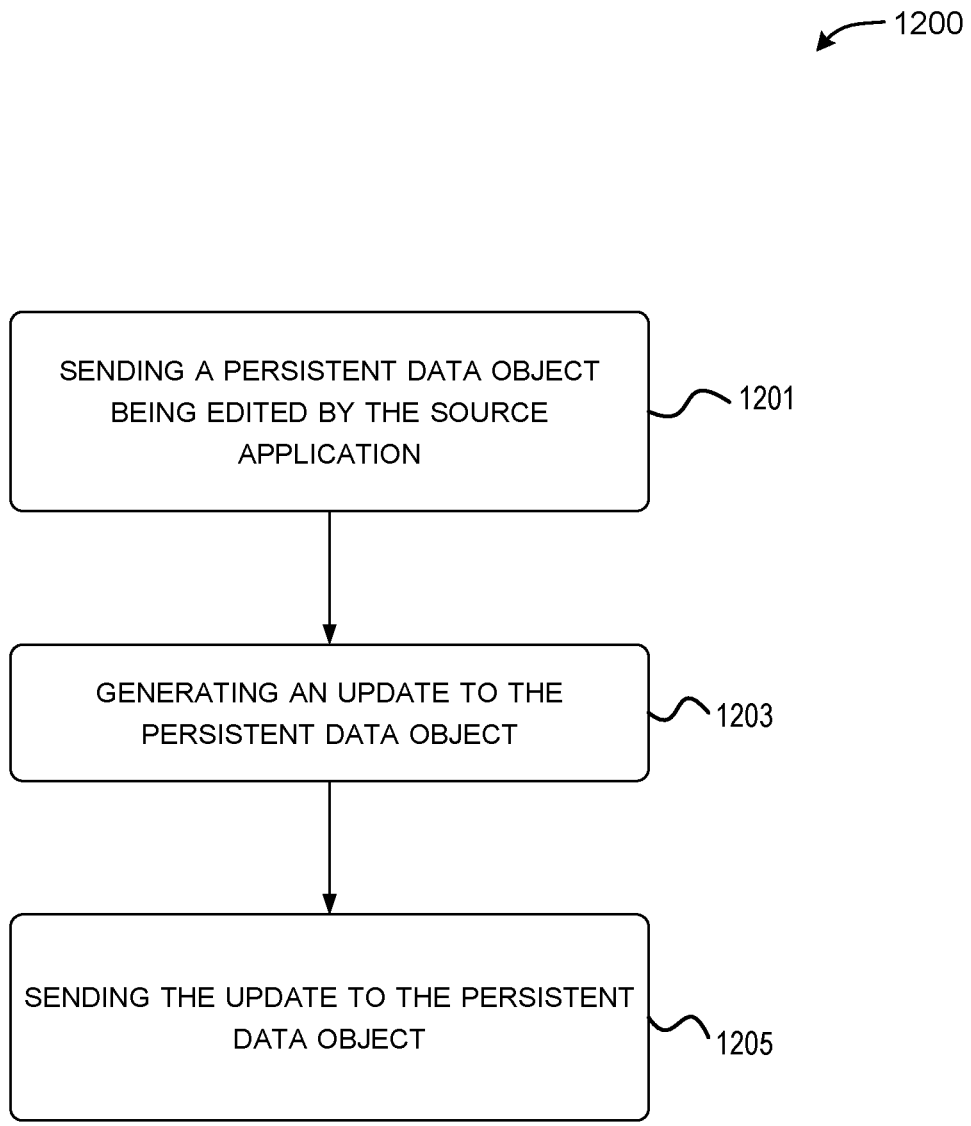
FIG. 12 illustrates aspects of a routine for enabling aspects of the techniques disclosed herein as shown and described below.

FIG. 12 illustrates aspects of a routine 1200 for enabling aspects of the techniques disclosed herein as shown and described below. The operations in FIG. 12 can be performed, for example, by the computing device 1300 of FIG. 13, as described above with respect to any one of FIGS. 1-9.

At operation 1201, a persistent data object being edited by the source application is sent to a data store by a source computing device executing a source application. In an embodiment, the persistent data object may be configured to be compatible with a plurality of applications and document types.

At operation 1203, an update to the persistent data object is generated.

At operation 1205, the update to the persistent data object may be sent to the data store. In an embodiment, the persistent data object may be compatible with documents that have incorporated the persistent data object.

In an embodiment, the update may be maintained as a version of the persistent data object, and access rights to versions of the persistent data object may be applied.

FIG. 13 shows additional details of an example computer architecture 1300 for a computer, such as a computing device executing chunk management function 1380 and chunk visualization logic 1390 (FIG. 13), capable of executing the program components described herein. Thus, the computer architecture 1300 illustrated in FIG. 13 illustrates an architecture for a server computer, a mobile phone, a PDA, a smart phone, a desktop computer, a netbook computer, a tablet computer, and/or a laptop computer. The computer architecture 1300 may be utilized to execute any aspects of the software components presented herein.

The computer architecture 1300 illustrated in FIG. 13 includes a central processing unit 1302 ("CPU"), a system memory 1304, including a random access memory 13013 ("RAM") and a read-only memory ("ROM") 13013, and a system bus 1310 that couples the memory 1304 to the CPU 1302. A basic input/output system containing the basic routines that help to transfer information between elements within the computer architecture 1300, such as during startup, is stored in the ROM 1306. The computer architecture 1300 further includes a mass storage device 1312 for storing an operating system 1307. Mass storage device 1312 may further include chunk visualization logic 1390 and chunk management function 1380, which include some or all of the aspects of chunk visualization functionality as disclosed herein and chunk management functionality as disclosed herein.

The mass storage device 1312 is connected to the CPU 1302 through a mass storage controller (not shown) connected to the bus 1310. The mass storage device 1312 and its associated computer-readable media provide non-volatile storage for the computer architecture 1300. Although the description of computer-readable media contained herein refers to a mass storage device, such as a solid state drive, a hard disk or CD-ROM drive, it should be appreciated by those skilled in the art that computer-readable media can be any available computer storage media or communication media that can be accessed by the computer architecture 1300.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 1300. For purposes of the claims, the phrase "computer storage medium," "computer-readable storage medium" and variations thereof, does not include waves, signals, and/or other transitory and/or intangible communication media, per se.

According to various configurations, the computer architecture 1300 may operate in a networked environment using logical connections to remote computers through the network 1310 and/or another network (not shown). The computer architecture 1300 may connect to the network 1310 through a network interface unit 1314 connected to the bus 1310. It should be appreciated that the network interface unit 1314 also may be utilized to connect to other types of networks and remote computer systems. The computer architecture 1300 also may include an input/output controller 1313 for receiving and processing input from a number of other devices, including a keyboard, mouse, or electronic stylus (not shown in FIG. 13). Similarly, the input/output controller 1313 may provide output to a display screen, a printer, or other type of output device (also not shown in FIG. 13).

It should be appreciated that the software components described herein may, when loaded into the CPU 1302 and executed, transform the CPU 1302 and the overall computer architecture 1300 from a general-purpose computing system into a special-purpose computing system customized to facilitate the functionality presented herein. The CPU 1302 may be constructed from any number of transistors or other discrete circuit elements, which may individually or collectively assume any number of states. More specifically, the CPU 1302 may operate as a finite-state machine, in response to executable instructions contained within the software modules disclosed herein. These computer-executable instructions may transform the CPU 1302 by specifying how the CPU 1302 transitions between states, thereby transforming the transistors or other discrete hardware elements constituting the CPU 1302.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, and/or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 1300 in order to store and execute the software components presented herein. It also should be appreciated that the computer architecture 1300 may include other types of computing devices, including hand-held computers, embedded computer systems, personal digital assistants, and other types of computing devices known to those skilled in the art. It is also contemplated that the computer architecture 1300 may not include all of the components shown in FIG. 13, may include other components that are not explicitly shown in FIG. 13, or may utilize an architecture completely different than that shown in FIG. 13.

The disclosure presented herein may be considered in view of the following example clauses.

Example Clause A, a method for managing shared data, the method comprising:
  receiving, at a data store, data generated by a source application;
  storing the data as a persistent data object that is configured to be compatible with a plurality of applications and document types, wherein the persistent data object is associated with a unique identifier;
  in response to a request for the persistent data object, accessing the persistent data object based on its unique identifier;
  sending the persistent data object to a computing device executing a destination application, wherein the persistent data object is incorporated by and is compatible with a destination document being edited by the destination application;
  receiving, from a user computing device, an update to the persistent data object, the update generated by a user application editing a user document on the user computing device; and
  in response to receiving an indication that the persistent data object has been inserted in the destination document by the destination computing device, sending, by the data store to the destination computing device, data indicative of the update to the persistent data object, the data usable to update the persistent data object as incorporated in the destination document.

Example Clause B, the method of Example Clause A, wherein the persistent data object is associated with a class, the class associated with logic that is operable to enable the destination computing device to render the data independently of rendering capabilities of the destination application.

Example Clause C, the method of Example Clause B, wherein a subset of the persistent data object is operable to be inserted in the destination document.

Example Clause D, the method of any one of Example Clauses A through C, further comprising sending data indicative of the updated persistent data object to a plurality of devices, applications, or documents that have incorporated or used the persistent data object prior to the update.

Example Clause E, the method of any one of Example Clauses A through D, wherein the persistent data object is associated with a license that enables access to the persistent data object.

Example Clause F, the method of any one of Example Clauses A through D, wherein updates to the persistent data object are selectively sent to the destination computing device based at least in part on attributes associated with the persistent data object.

Example Clause G, the method of any one of Example Clauses A through F, wherein the persistent data object is further associated with metadata indicative of users who are authorized to view or edit the persistent data object.

Example Clause H, the method of any one of Example Clauses A through G, further comprising providing the persistent data object in a flattened format.

Example Clause I, the method of any one of Example Clauses A through G, wherein the destination document is automatically updated, based on a user option, when the persistent data object is updated.

Example Clause J, the method of any one of Example Clauses A through I, wherein the destination document is prevented from being updated based on a user option when the persistent data object is updated.

Example Clause K, the method of any one of Example Clauses A through J, wherein the persistent data object is associated with a grouping mechanism, and wherein the persistent data object is associated with a shared attribute value that indicates which group the persistent data object belongs to.

While Example Clauses A through K are described above with respect to a method, it is understood in the context of this disclosure that the subject matter of Example Clauses A through L can additionally or alternatively be implemented as a device, system, or via computer readable storage media.

Example Clause L, a computing device comprising:
one or more processors;
a memory in communication with the one or more processors, the memory having computer-readable instructions stored thereupon which, when executed by the one or more processors, cause the computing device to:
insert, by a destination application executing on the computing device, a persistent data object in a destination document being edited by the destination application, wherein the persistent data object is configured to be compatible with a plurality of applications and document types;
receiving an update to the persistent data object, the update generated by a user application editing a user document on a user computing device; and
in response to receiving the update to the persistent data object, updating, by the destination application, the persistent data object inserted in the destination document.

Example Clause M, the computing device of Example Clause L, wherein the persistent data object is originally generated by a source application running on a source computing device.

Example Clause N, the computing device of Example Clause L or Example Clause M, wherein the persistent data object is originally generated by the destination application, and the generated persistent data object is sent to a remote data store configured to store a plurality of persistent data objects.

Example Clause O, the computing device of Example Clauses L through Example Clause N, wherein the destination application is configured to process the persistent data object to render a representation of the persistent data object.

Example Clause P, the computing device of Example Clauses L through Example Clause O, wherein the representation includes one or more of an author, data/time stamp, version, and title.

Example Clause Q, the computing device of Example Clauses L through Example Clause P, wherein the version comprises a plurality of versions of the persistent data object, and wherein an option is provided to select one of the versions for incorporation into the destination document.

Example Clause R, the computing device of Example Clauses L through Example Clause Q, wherein the version comprises a plurality of versions of the persistent data object, and wherein an option is provided to select one of the versions for incorporation into the destination document.

While Example Clauses L through R are described above with respect to a computing device, it is understood in the context of this disclosure that the subject matter of Example Clauses L through R can additionally or alternatively be implemented by a method or via computer readable storage media.

Example Clause S, a computer-implemented method, comprising:
sending, to a data store by a source computing device executing a source application, a persistent data object being edited by the source application, wherein the persistent data object is configured to be compatible with a plurality of applications and document types;
generating an update to the persistent data object; and
sending, to the data store, the update to the persistent data object, wherein the persistent data object is compatible with documents that have incorporated the persistent data object.

Example Clause T, the device of Example Clause S, wherein the update is maintained as a version of the persistent data object, and access rights to versions of the persistent data object is applied.

While Example Clauses S through T are described above with respect to a method, it is understood in the context of this disclosure that the subject matter of Example Clauses S through T can additionally or alternatively be implemented as a device or via computer readable storage media.

Although the techniques have been described in language specific to structural features and/or methodological acts, it is to be understood that the appended claims are not necessarily limited to the features or acts described. Rather, the features and acts are described as example implementations of such techniques.

The operations of the example processes are illustrated in individual blocks and summarized with reference to those blocks. The processes are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as FPGAs, DSPs, or other types of accelerators.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described examples, the elements of which are to be understood as being among other acceptable examples. All such modifications and variations are intended to be included herein within the scope of this disclosure and protected by the following claims.

What is claimed is:

1. A method performed by a computing system, the method comprising:
    receiving, at a data store, data from a source application;
    storing, at the data store, the data as a persistent data object that is compatible with a plurality of applications and document types;
    associating, by the computing system, the persistent data object with a unique identifier;
    in response to a request for the persistent data object, accessing the persistent data object based on its unique identifier;
    sending the persistent data object to a first computing device programmed to execute a destination application configured to incorporate, by the destination application, the persistent data object into a destination document;
    receiving, at the data store from a second computing device, an update to the persistent data object, the update generated in a user document edited by the second computing device; and
    in response to determining that the persistent data object has been incorporated by the first computing device in the destination document, sending, by the data store to the first computing device, data indicative of the update to the persistent data object, the destination application programmed to update the persistent data object as incorporated in the destination document;
    wherein the persistent data object is associated with a class that is associated with class-specific logic that is operable to enable the destination computing device to render the data independently of rendering capabilities of the destination application; and
    wherein the persistent data object is associated with a grouping mechanism, and wherein the persistent data object is associated with a shared attribute value that indicates which group the persistent data object belongs to.

2. The method of claim 1, wherein a subset of the persistent data object is operable to be inserted in the destination document.

3. The method of claim 1, further comprising sending data indicative of the updated persistent data object to a plurality of devices, applications, or documents that have incorporated or used the persistent data object prior to the update.

4. The method of claim 1, wherein the persistent data object is associated with a license that enables access to the persistent data object.

5. The method of claim 1, wherein updates to the persistent data object are selectively sent to the destination computing device based at least in part on attributes associated with the persistent data object.

6. The method of claim 1, wherein the persistent data object is further associated with metadata indicative of users who are authorized to view or edit the persistent data object.

7. The method of claim 1, further comprising providing the persistent data object in a flattened format.

8. The method of claim 1, wherein the destination document is automatically updated, based on a user option, when the persistent data object is updated.

9. The method of claim 1, wherein the destination document is prevented from being updated based on a user option when the persistent data object is updated.

10. A computing device comprising:
    one or more processors;
    a memory in communication with the one or more processors, the memory having computer-readable instructions stored thereupon which, when executed by the one or more processors, cause the computing device to:
    insert, by a destination application executing on the computing device, a persistent data object in a destination document being edited by the destination application, wherein the persistent data object is configured to be compatible with a plurality of applications and document types;
    receive an update to the persistent data object, the update generated in a user document edited by a user application on a user computing device; and
    in response to receiving the update to the persistent data object, update, by the destination application executing on the computing device, the persistent data object inserted in the destination document while the destination document is being edited by the destination application;
    wherein the persistent data object is associated with a class that is associated with class-specific logic that is operable to enable the computing device to render the data independently of rendering capabilities of the destination application; and
    wherein the persistent data object is associated with a grouping mechanism, and wherein the persistent data object is associated with a shared attribute value that indicates which group the persistent data object belongs to.

11. The computing device of claim 10, further comprising allowing the destination application to lock a specific timeframe of an instance of information in the persistent data object, wherein external updates to the persistent data object are not received by the destination document.

12. The computing device of claim 10, wherein the persistent data object is originally generated by a source application running on a source computing device.

13. The computing device of claim 10, wherein the persistent data object is originally generated by the destination application, and the generated persistent data object is sent to a remote data store configured to store a plurality of persistent data objects.

14. The computing device of claim 10, wherein the destination application is configured to process the persistent data object to render a representation of the persistent data object.

15. The computing device of claim 14, wherein the representation includes one or more of an author, data/time stamp, version, and title.

16. The computing device of claim 15, wherein the version comprises a plurality of versions of the persistent data object, and wherein an option is provided to select one of the versions for incorporation into the destination document.

17. A computer-implemented method, comprising:
sending, to a data store by a source computing device executing a source application, a persistent data object being edited by the source application, wherein the persistent data object, stored at the data store, is configured to be compatible with a plurality of applications and document types;
generating, by the source application on the source computing device, an update to the persistent data object; and
sending, to the data store, the update to the persistent data object, wherein the update to the persistent data object is compatible with and available to documents that have incorporated the persistent data object;
wherein the persistent data object is associated with a class that is associated with class-specific logic that is operable to enable receiving computing devices to render the data independently of rendering capabilities of the receiving computing devices; and
wherein the persistent data object is associated with a grouping mechanism, and wherein the persistent data object is associated with a shared attribute value that indicates which group the persistent data object belongs to.

18. The method of claim 17, wherein the update is maintained as a version of the persistent data object, and access rights to versions of the persistent data object is applied.

* * * * *